United States Patent
Ito et al.

(10) Patent No.: US 11,847,421 B2
(45) Date of Patent: Dec. 19, 2023

(54) DISCUSSION SUPPORT DEVICE AND PROGRAM FOR DISCUSSION SUPPORT DEVICE

(71) Applicant: NAGOYA INSTITUTE OF TECHNOLOGY, Nagoya (JP)

(72) Inventors: Takayuki Ito, Kitanagoya (JP); Shun Shiramatsu, Nagoya (JP); Shota Suzuki, Ama-gun (JP)

(73) Assignee: NAGOYA INSTITUTE OF TECHNOLOGY, Nagoya (JP)

( * ) Notice: Subject to any disclaimer, the term of this patent is extended or adjusted under 35 U.S.C. 154(b) by 500 days.

(21) Appl. No.: 17/266,893

(22) PCT Filed: Aug. 7, 2019

(86) PCT No.: PCT/JP2019/031183
§ 371 (c)(1),
(2) Date: Feb. 8, 2021

(87) PCT Pub. No.: WO2020/032125
PCT Pub. Date: Feb. 13, 2020

(65) Prior Publication Data
US 2021/0319187 A1   Oct. 14, 2021

(30) Foreign Application Priority Data
Aug. 7, 2018   (JP) .................... 2018-148665

(51) Int. Cl.
*G06F 40/35* (2020.01)
*G06F 40/268* (2020.01)
(Continued)

(52) U.S. Cl.
CPC ........... *G06F 40/35* (2020.01); *G06F 40/226* (2020.01); *G06F 40/268* (2020.01); *G06N 3/045* (2023.01); *G06N 3/08* (2013.01)

(58) Field of Classification Search
CPC ...... G06F 40/35; G06F 40/268; G06F 40/226; G06N 3/045; G06N 3/08
See application file for complete search history.

(56) References Cited

U.S. PATENT DOCUMENTS

| 2016/0012152 A1* | 1/2016 | Johnson | G06Q 10/00 |
| | | | 707/798 |
| 2018/0146044 A1* | 5/2018 | Wu | H04L 67/06 |

FOREIGN PATENT DOCUMENTS

| EP | 1612701 A2 * | 1/2006 | G06F 16/367 |
| JP | 2011-187064 A | 9/2011 | |

(Continued)

OTHER PUBLICATIONS

Innocentive; <URL:http://Innocentive.com/our-solvers>; 2021.
(Continued)

*Primary Examiner* — Abul K Azad
(74) *Attorney, Agent, or Firm* — Oliff PLC

(57) ABSTRACT

A discussion support device acquires, via a communication network, a plurality of comments relating to a main topic of a discussion, extracts a plurality of ideas, a plurality of favorable points, a plurality of unfavorable points, and a plurality of issues from the acquired plurality of comments, identifies a topology between the extracted plurality of ideas, plurality of favorable points, plurality of unfavorable points, and plurality of issues, and creates a facilitation structure to realize the identified topology.

7 Claims, 11 Drawing Sheets

(51) Int. Cl.
  *G06F 40/226* (2020.01)
  *G06N 3/08* (2023.01)
  *G06N 3/045* (2023.01)

(56) References Cited

FOREIGN PATENT DOCUMENTS

| JP | 2012-014234 A | 1/2012 |
|---|---|---|
| JP | 2013-003880 A | 1/2013 |

OTHER PUBLICATIONS

Quora; <URL: http://Quora.com/about>; 2020.
Malone et al.; "Harnessing Collective Intelligence to Address Global Climate Change;" Innovations; Technology, Governance, Globalization; 2007; pp. 15-16; vol. 3, No. 2.
Klein; "The MIT Deliberatorium: Enabling Large-scale Deliberation about Complex Systemic Problems;" MIT Center for Collective Intelligence; 2011.
Klein; "Enabling Large-Scale Deliberation Using Attention-Mediation Metrics;" Computer Supported Cooperative Word; 2012; pp. 449-473; vol. 21.
Sycara; "The Persuader;" Encyclopedia of Artificial Intelligence; 1992; pp. 1131.
Sycara-Cyranski; "Arguments of Persuasion in Labour Mediation;" Proceedings of the Ninth International Joint Conference on Artificial Intelligence; 1985; pp. 294-296; vol. 1.
Bain; "Judge: A Case-based Reasoning System;" Machine Learning, The Kluwer International Series in Engineering and Computer Science (Knowledge Representation, Learning and Expert Systems); 1986; vol. 12.
Kunz et al.; "Issues as Elements on Information Systems;" Working Paper No. 131; Institute of Urban and Regional Development; 1970.
Conklin et al.; "gIBIS: A Hypertext Tool for Exploratory Policy Discussion;" ACM Transactions on Information Systems; 1988; pp. 303-331; vol. 6, No. 4.
Moens; "Argumentation mining: How can a machine acquire common sense and world knowledge?;" Argument & Computation; 2018; pp. 1-15; vol. 9.
Hisakane et al.; "A Diagramming Method of Case Method Discussion by using Cascade SVM;" Documents of research group of the Institute of Electrical Engineering of Japan; 2015; pp. 69-74.
Ikeda et al.; "A method for extracting opinions of discussion participants from preceding context to generate facilitator's questions;" The 31st Annual Conference of the Japanese Society for Artificial Intelligence; 2017; pp. 1-3.
Oct. 29, 2019 Search Report issued in International Patent Application No. PCT/JP2019/031183.
Oct. 29, 2019 Written Opinion of the International Searching Authority issued in International Patent Application No. PCT/JP2019/031183.

\* cited by examiner

[FIG.1]
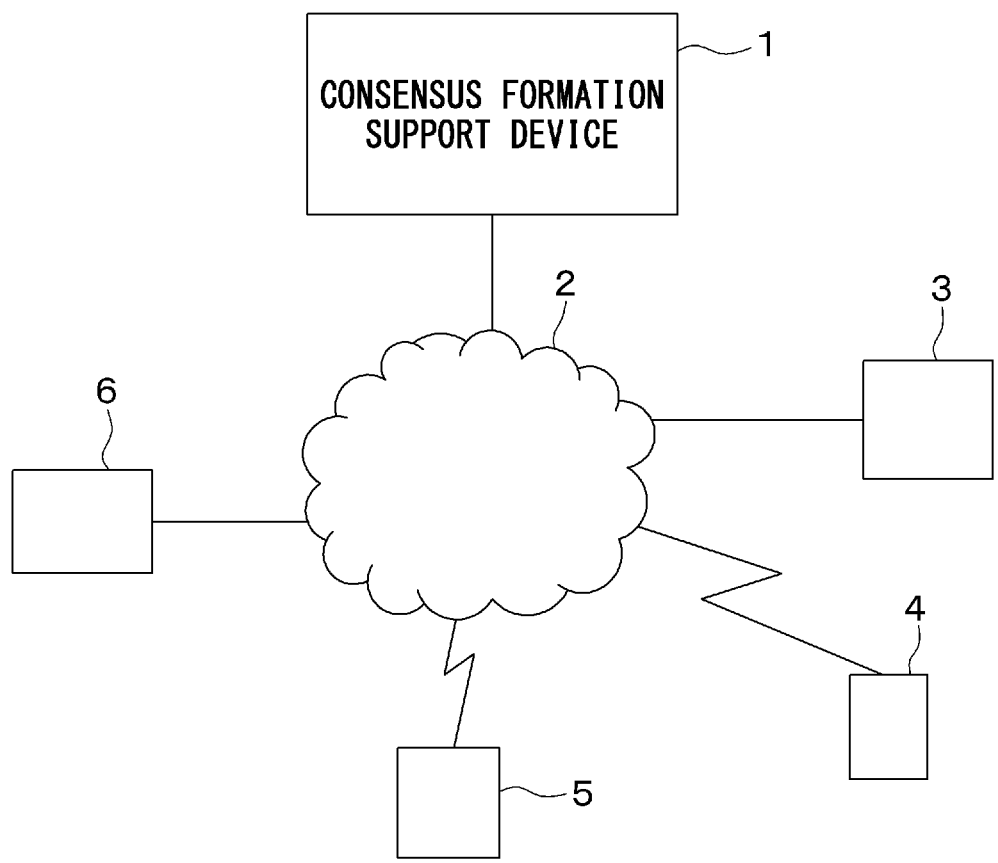

[FIG.2]
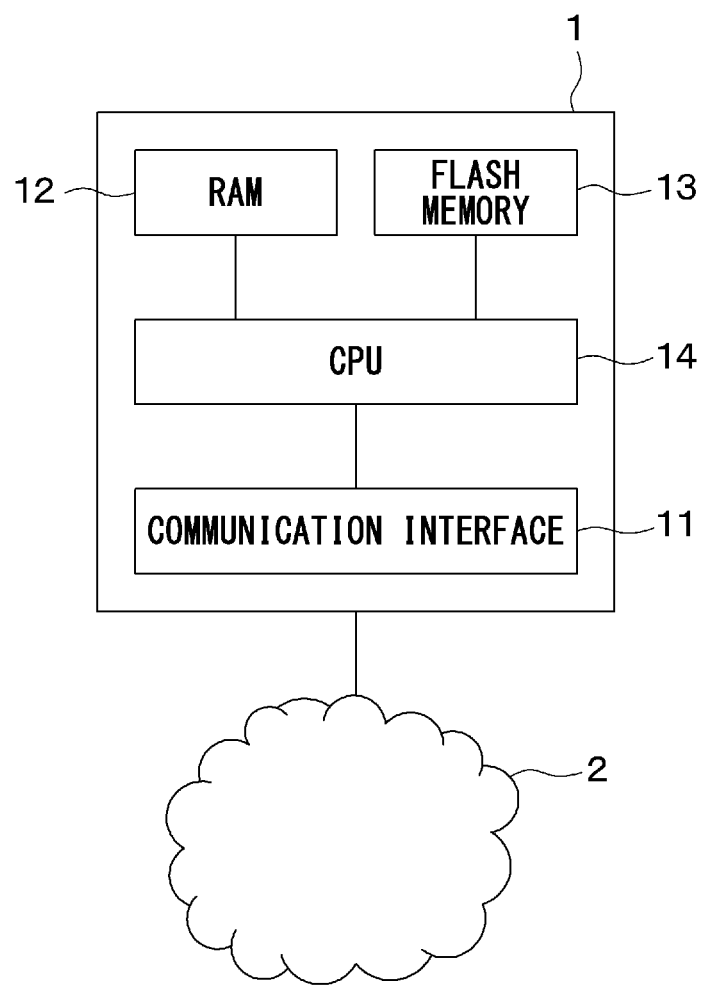

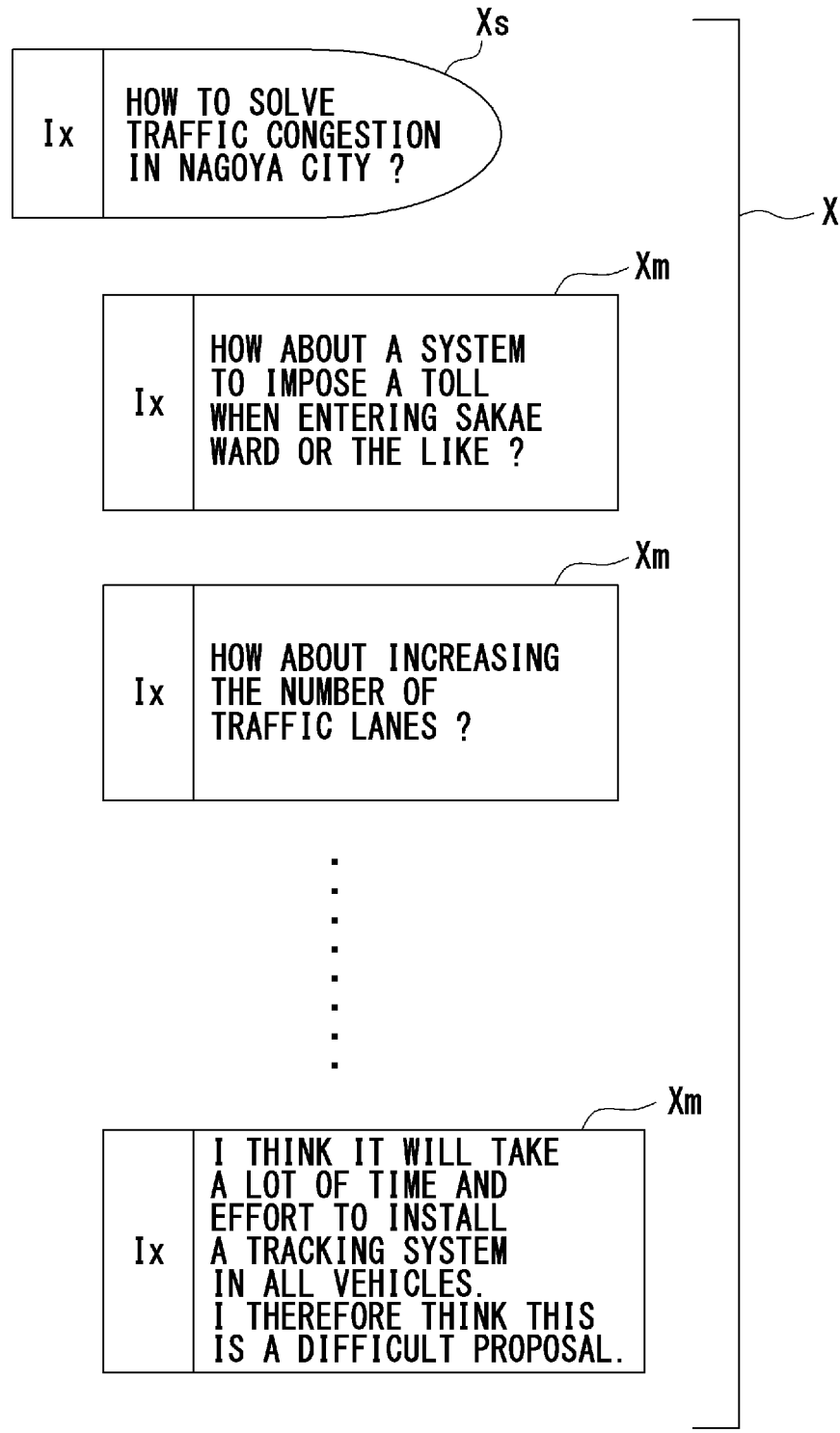

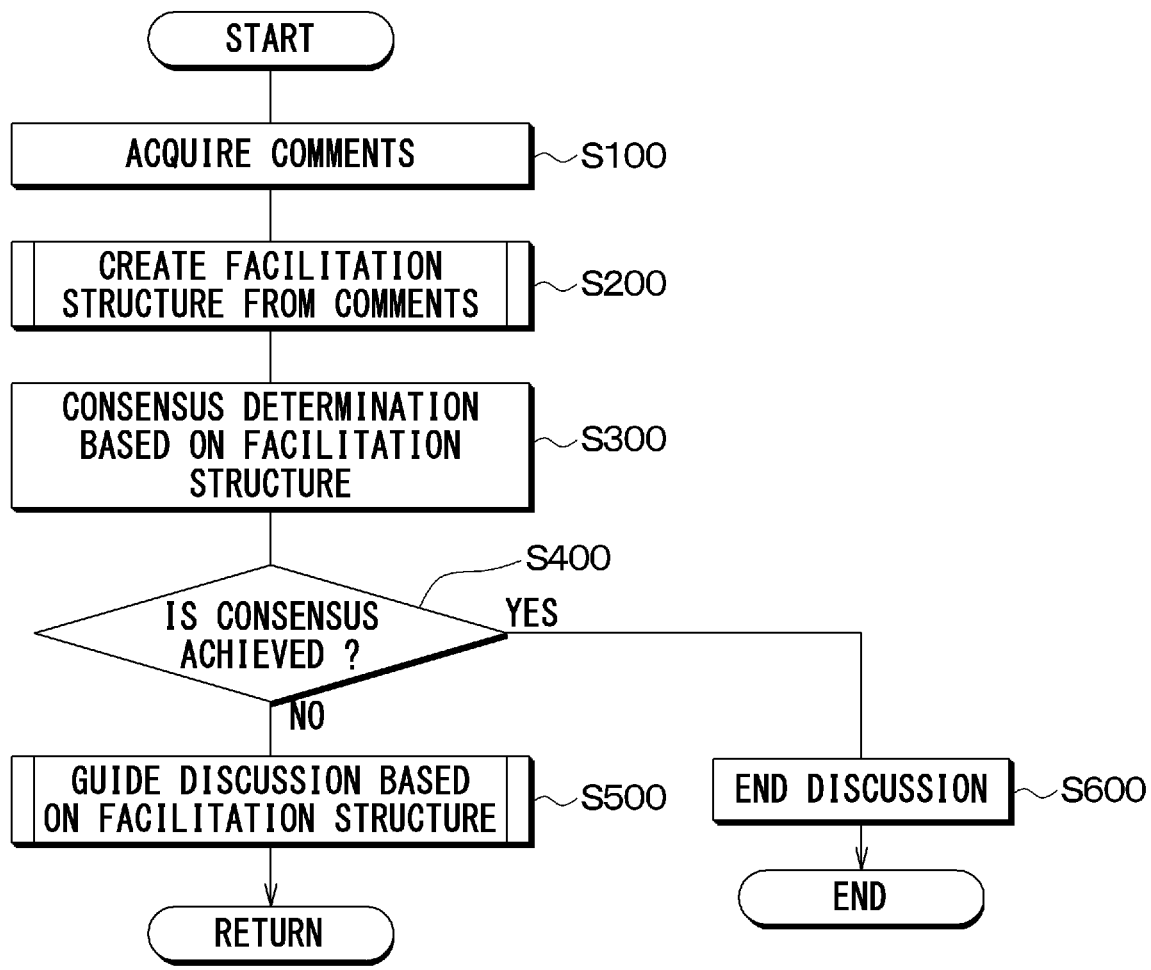

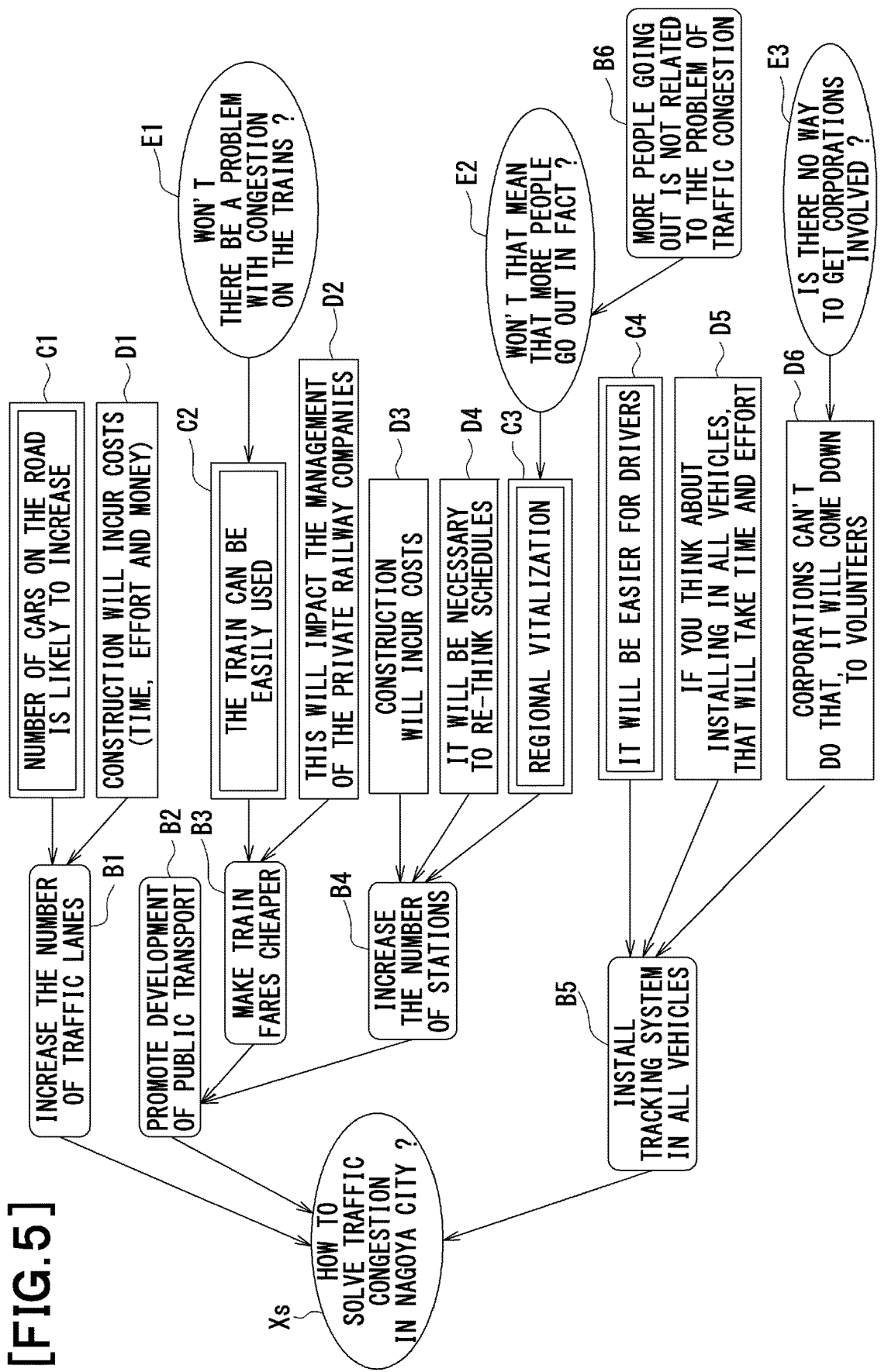
[FIG.5]

[FIG.6]
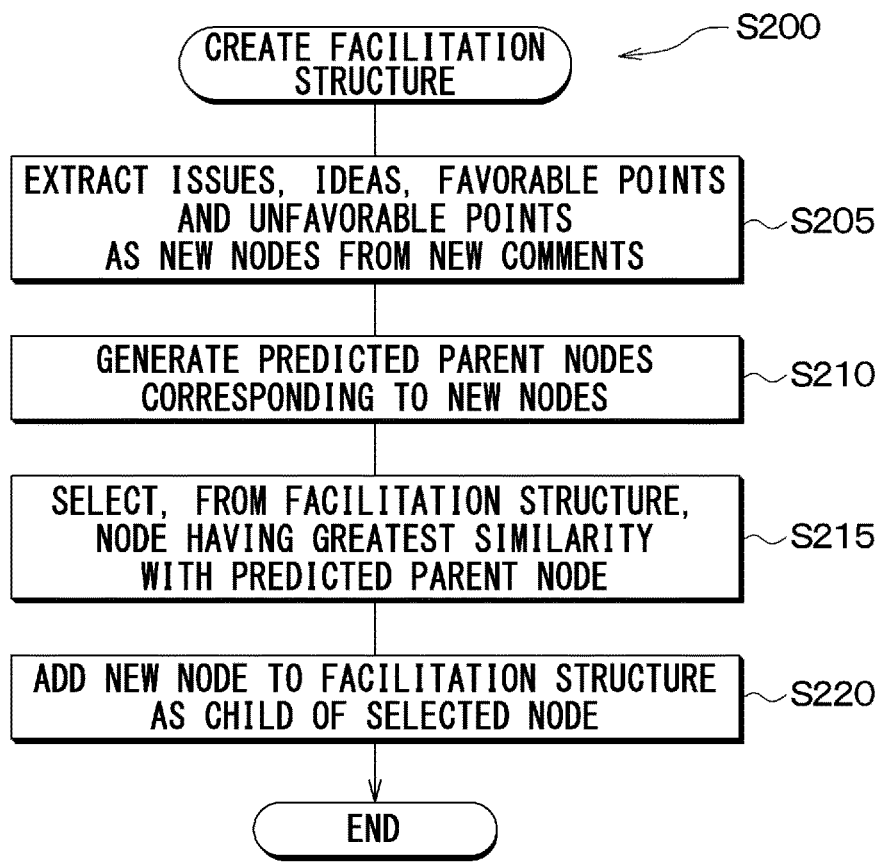
[FIG.7]
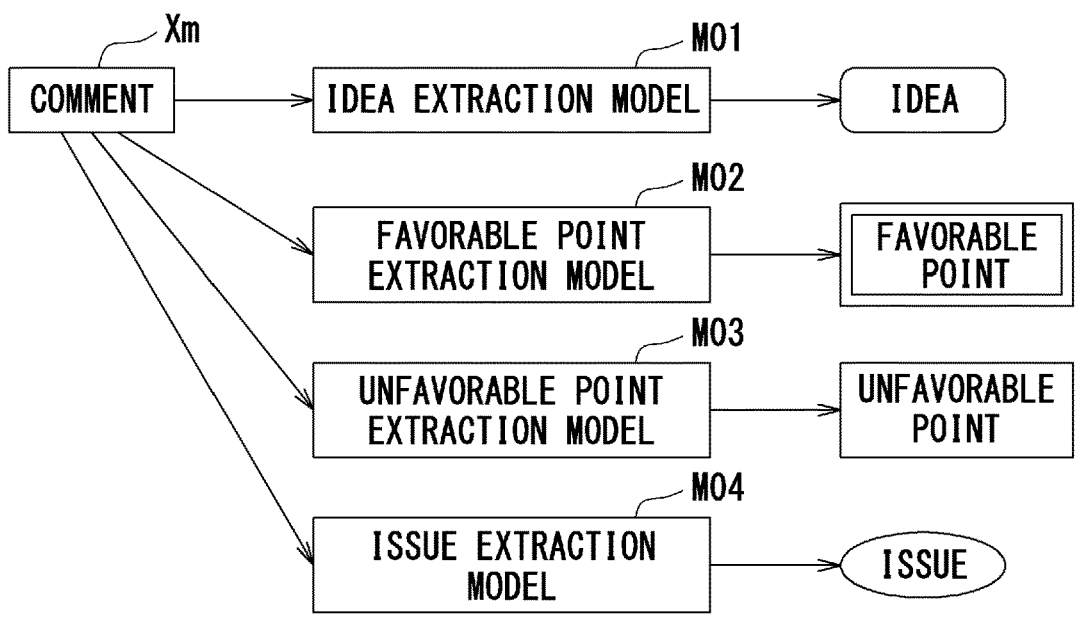

[FIG.8]
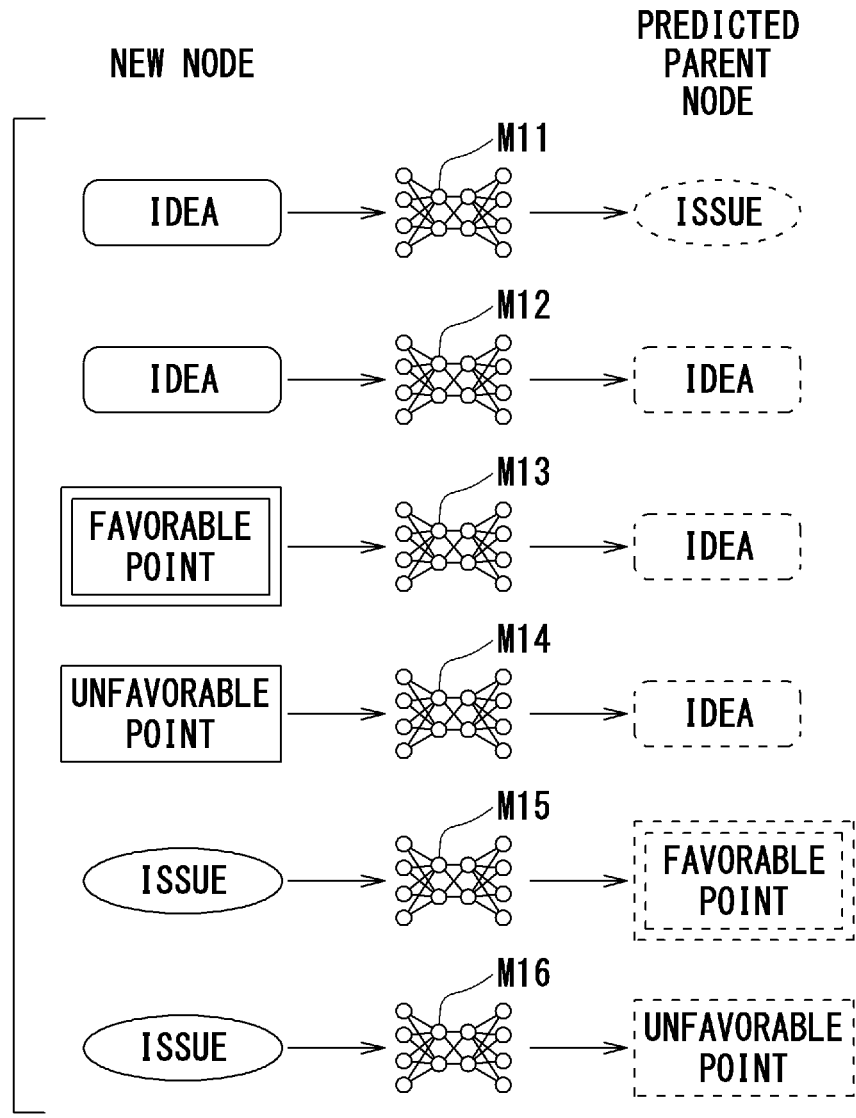
[FIG.9]
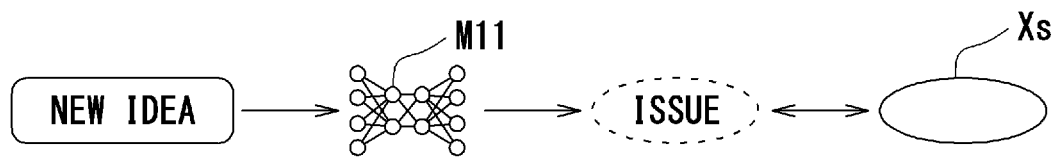

[FIG.10]
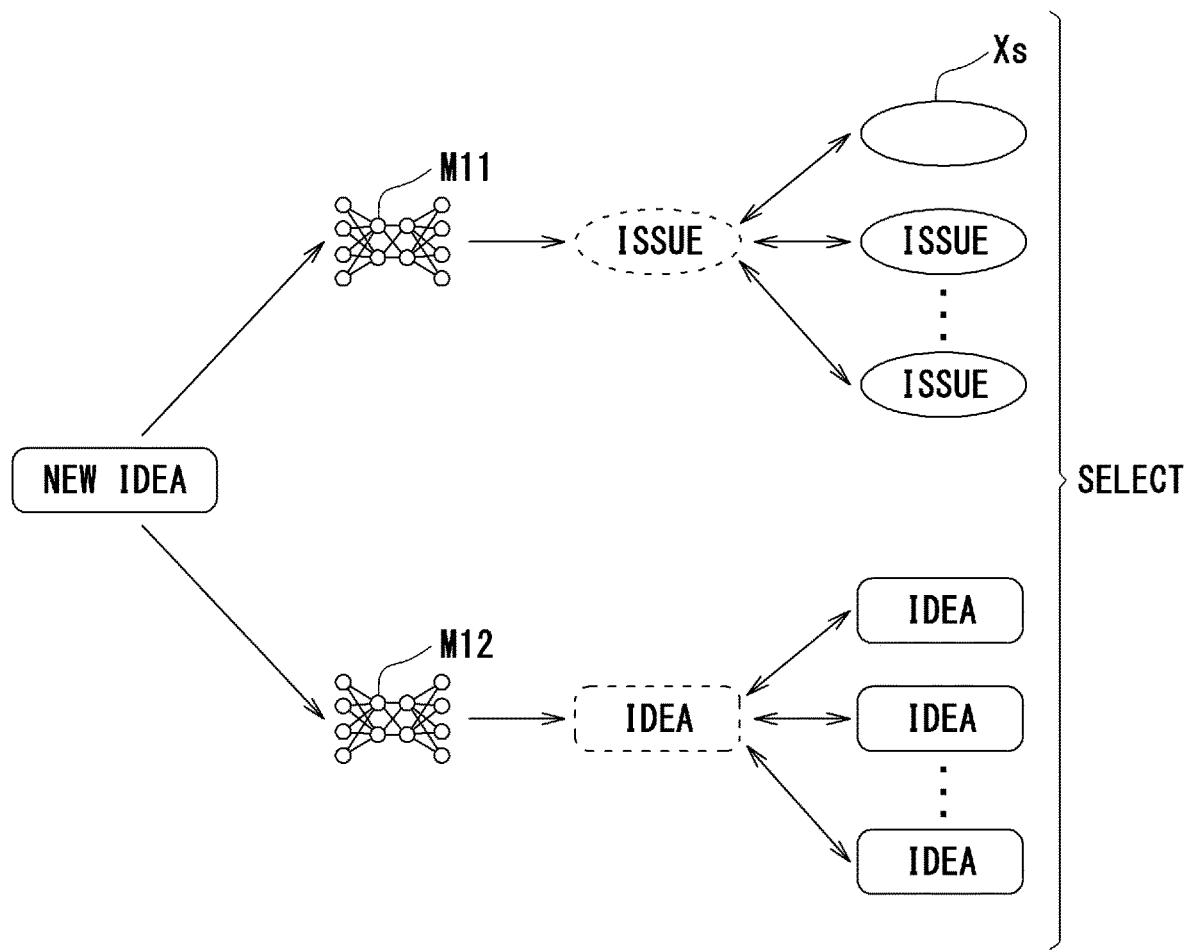
[FIG.11]
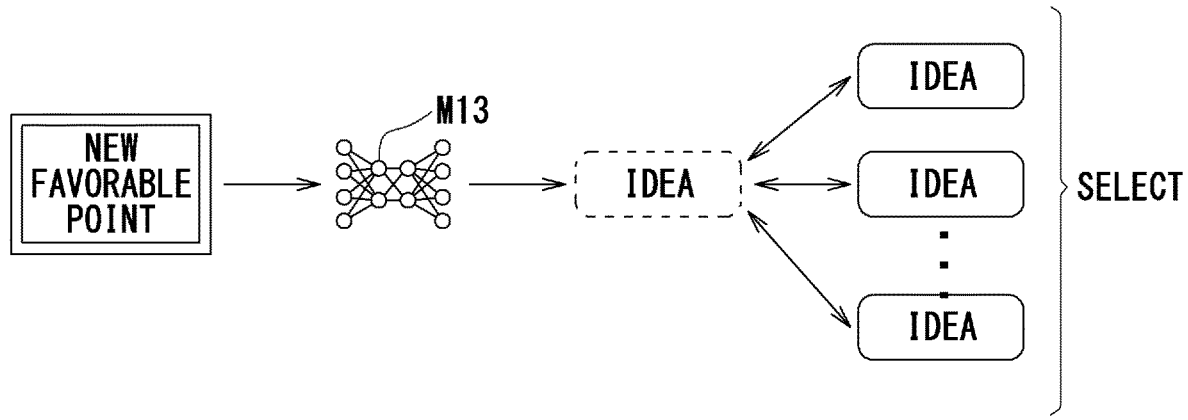

[FIG.12]
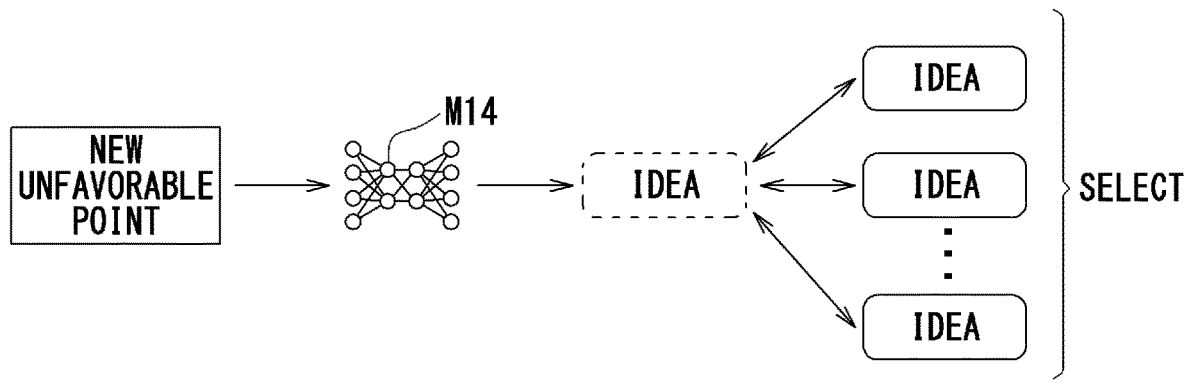
[FIG.13]
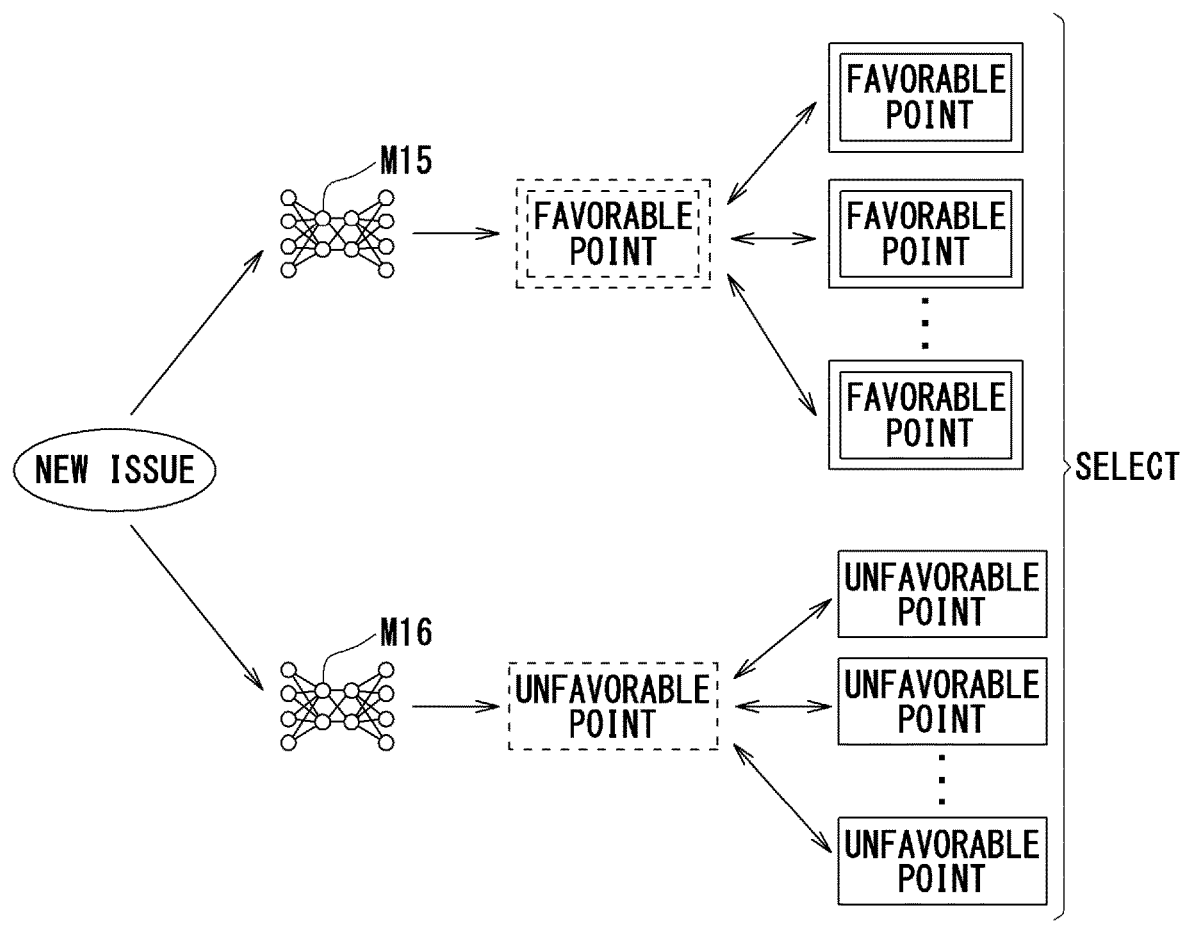

[FIG.14]
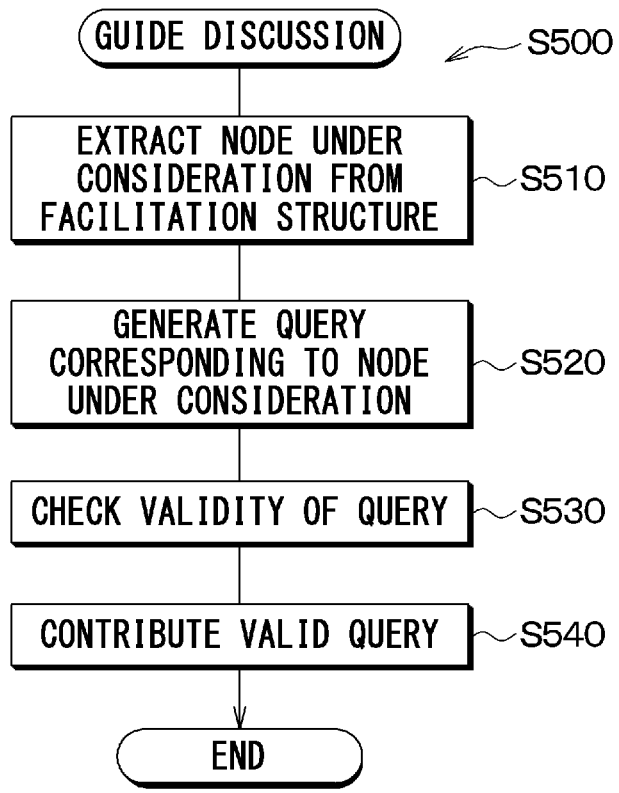

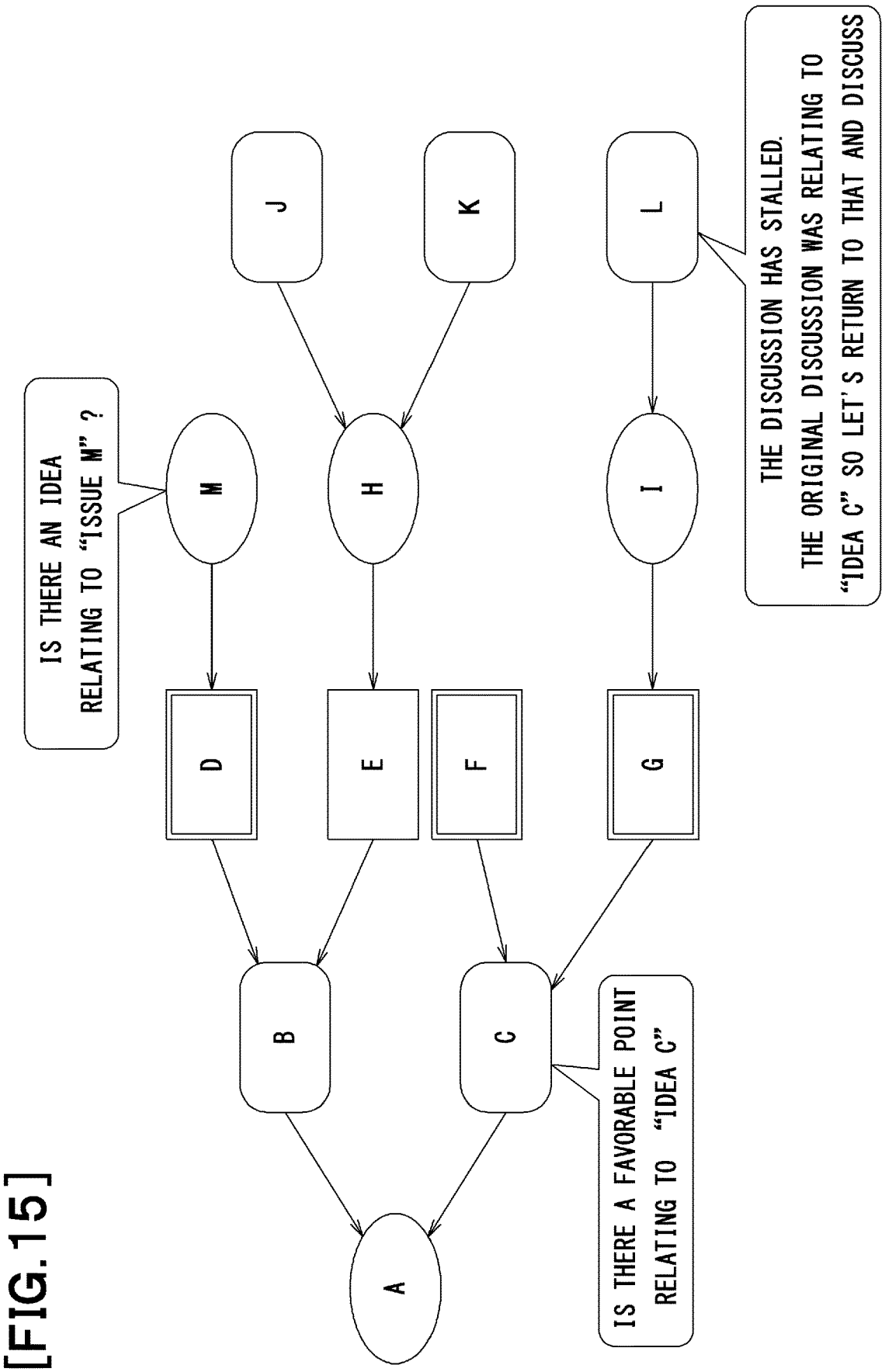
[FIG.15]

DISCUSSION SUPPORT DEVICE AND PROGRAM FOR DISCUSSION SUPPORT DEVICE

TECHNICAL FIELD

The present invention relates to a discussion support device and a program for a discussion support device.

BACKGROUND ART

In recent years, as a result of advances in social networking systems, it has become possible to gather, via the Internet, comments of tens of thousands of people, millions of people, or the like. In related art, Innocentive and Quola are known (refer to Non-Patent Literature 1 and Non-Patent Literature 2) as systems supporting the gathering of ideas from a crowd of people, or supporting question answering.

CITATION LIST

Patent Literature

[PTL 1] Japanese Patent Application Publication No. JP-A-2012-14234
[PTL 2] Japanese Patent Application Publication No. JP-A-2013-3880

Non-Patent Literature

[NPTL 1] Innocentive, [online], [Retrieved 2018 Jul. 27], Internet <URL:http://Innocentive.com>
[NPTL 2] Quora, [online], [Retrieved 2018 Jul. 27], Internet <URL:http://Quora.com>
[NPTL 3] Thomas W. Malone; Mark Klein (Summer 2007), "Harnessing Collective Intelligence to Address Global Climate Change", Innovations: Technology, Governance, Globalization. MIT Press. 2 (3): 15-26, doi:10.1162/itgg.2007.2.3.15, ISSN 1558-2477, Retrieved 2013 Sep. 25
[NPTL 4] Mark Klein (2012), "Enabling Large-Scale Deliberation Using Attention-Mediation Metrics" (PDF), Computer Supported Cooperative Work. 21: 449-473, doi:10.1007/s10606-012-9156-4
[NPTL 5] Mark Klein; Ali Gurkan; Luca Iandoli, "Deliberatorium: Supporting Large-Scale Online Deliberation", MIT Center for Collective Intelligence, Retrieved 2013 Sep. 25
[NPTL 6] Sycara, K. "The PERSUADER", In The Encyclopedia of Artificial Intelligence, D. Shapiro (Ed.), John Wiley and Sons Inc., New York, N.Y., January, 1992
[NPTL 7] Sycara, K. "Arguments of Persuasion in Labour Mediation", In Proceedings of the Ninth International Joint Conference on Artificial Intelligence (IJCAI-85), vol 1, pp. 294-296, Los Angeles, Ca., August 1985.
[NPTL 8] Bain W. M. (1986) Judge: A Case-based Reasoning System, In: Machine Learning, The Kluwer International Series in Engineering and Computer Science (Knowledge Representation, Learning and Expert Systems), vol 12. Springer, Boston, MA
[NPTL 9] KUNZ, W., AND RITTEL, H. Issues as elements of information systems. Working Paper No. 131, Institute of Urban and Regional Development, Univ. of California, Berkeley, Calif., 1970.
[NPTL 10] Conklin, E. Jeffrey; Begeman, Michael L. (October 1988). "gIBIS: a hypertext tool for exploratory policy discussion" (PDF). ACM Transactions on Information Systems. 6 (4): 303-331. doi:10.1145/58566.59297. Retrieved 2017 May 26.
[NPTL 11] Marie-Francine Moens, Argumentation mining: How can a machine acquire common sense and world knowledge? DOI: 10.3233/AAC-170025, Argument & Computation, vol. 9, no. 1, pp. 1-14, 2018

SUMMARY OF INVENTION

Technical Problem

According to the consideration of the inventors, if comments acquired via a communication network are well summarized, and the organization or progression of a large scale discussion by a large number of people is supported, decision making by a large scale number of people, which was previously not possible, becomes possible. However, the above-mentioned Innocentive and Quola are systems which focus mainly on generating ideas, and have not gone as far as supporting discussion on the basis of opinions and preferences. For example, when deciding a travel destination, even if many candidates are suggested as places it is wished to travel to, there is no advance in the organization or progression of the discussion.

In light of the foregoing, it is an object of the present invention to provide, in a system that acquires comments via a communication network, technology that supports organization or progression of a discussion.

Solution to Problem

In order to achieve the above-described object, according to an aspect, a discussion support device includes: a comment acquisition portion configured to acquire, via a communication network, a plurality of comments relating to a main topic of a discussion, and to store the acquired plurality of comments in a storage medium; and a structure creating portion configured to create a facilitation structure on the basis of the plurality of comments acquired and stored by the acquisition portion. The facilitation structure includes the main topic as a root node, and is data representing a tree structure including, as a single node thereof, each of a plurality of ideas, each of a plurality of evaluations, and each of a plurality of issues included in the plurality of comments. The plurality of ideas includes a node representing a proposal to solve one of the main topic to be a parent node and an issue to be a parent node among the plurality of issues. The plurality of evaluations includes a node representing an evaluation of an idea to be a parent node among the plurality of ideas, and the plurality of issues includes a node representing an issue relating to an evaluation to be a parent node among the plurality of ideas. The structure creating portion includes an extraction portion configured to extract the plurality of ideas, the plurality of evaluations, and the plurality of issues from the plurality of comments stored in the storage medium by the comment acquisition portion, an identification portion configured to identify a topology between the plurality of ideas, the plurality of evaluations, and the plurality of issues extracted by the extraction portion, and a recording portion configured to create the facilitation structure so as to realize the topology between the plurality of ideas, the plurality of evaluations, and the plurality of issues identified by the link portion, and to store the facilitation structure in the storage medium.

In this manner, the discussion support device extracts the plurality of ideas, the plurality of evaluations, and the plurality of issues from the plurality of comments, and generates the tree structure including those as the nodes thereof and having the main topic of the discussion as the root node thereof, that is, generates the facilitation structure. The facilitation structure created in this manner is a structure for problem solving of the mutually related plurality of ideas, plurality of evaluations and plurality of issues. Thus, the discussion support device can support the organization of the discussion by generating the facilitation structure.

Further, according to another aspect, for each of the plurality of comments, the extraction portion extracts one of an idea, an evaluation, and an issue included in the comment, by inputting the comment into an idea extraction model (M01) that is a neural network trained to output an idea included in the comment when the comment is input thereinto, inputting the comment into an evaluation extraction model (M02, M03) that is a neural network trained to output an evaluation included in the comment when the comment is input thereinto, and inputting the comment into an issue extraction model (M04) that is a neural network trained to output an issue included in the comment when the comment is input thereinto.

When a person becomes a facilitator and creates the facilitation structure while progressing the discussion, a determination as to whether the obtained comment includes an idea, includes an evaluation with respect to an idea, or includes an issue is made intuitively in many cases. This intuitive determination is a product of extremely complex cognitive operations that are subconsciously performed in the brain of the facilitator, and in related art, it has not been possible for a computer to execute the same determination.

The present inventors, as a method for replacing this determination with a computer, have conceived the idea of a method using a plurality of neural networks. Specifically, they have conceived the idea of preparing the neural networks trained to output nodes separately corresponding to a type, namely, ideas, evaluations, and issues, and of using these trained neural networks in the manner described above. By using this type of method, ideas, evaluations, and issues can be appropriately extracted from comments, without relying on human intuition.

Further, according to another aspect, the identification portion includes a predicted parent node generation portion configured to, when one of an idea, an evaluation and an issue is extracted as a new node by the extraction portion, generate a predicted parent node to be a parent node of the new node, separately from the nodes in the facilitation structure, and a high similarity node selection portion configured to select, from the facilitation structure, the node for which a similarity with the predicted parent node is higher than a predetermined reference. The recording portion adds the new node to the facilitation structure as a child node of the node selected by the high similarity node selection portion, and the predicted parent node generation portion generates the predicted parent node by inputting the new node into a trained model that is a neural network trained in advance to generate, when a given node is input thereinto, a node to be a parent node of the given node, separately from the nodes in the facilitation structure.

When a person acts as a facilitator and creates a facilitation structure while progressing a discussion, with respect to a new node corresponding to an idea, an evaluation, or an issue extracted from a comment, the person determines of which of the nodes present in the facilitation structure the new node is to become a child node of. In many cases, this determination is made intuitively. This intuitive determination is the product of the extremely complex cognitive operations that are subconsciously performed in the brain of the facilitator, and in related art, it has not been possible for a computer to execute the same determination.

The present inventors, as a method for replacing this determination with a computer, have conceived the idea of not directly selecting the parent node of the new node corresponding to the idea, the evaluation, or the issue, but performing the selection through an indirect process.

Specifically, the idea has been conceived that, when the idea, the evaluation, or the issue is extracted as the new node, the predicted parent node that is to be the parent node of the new node is generated separately from the nodes in the facilitation structure. In other words, the idea has been conceived to first create the predicted parent node as an ideal parent node, independently of the nodes in the facilitation structure. Then, the idea has been conceived to extract the parent node to which the new node is to be connected, on the basis of the similarity with the predicted parent node generated in this way.

The present inventors have verified, through assessment, that the generating of the ideal parent node for the new node without being bound to the nodes in the facilitation structure is relatively simple for a computer. Thus, by employing the indirect method of generating the ideal parent node without being bound to the nodes in the facilitation structure, it is possible to appropriately select the parent node from the facilitation structure appropriately, without relying on human intuition.

The neural network is suited to the type of process for generating the ideal parent node without being bound to external data, such as the facilitation structure or the like, and thus, the more appropriate predicted parent node can be generated.

Further, according to another aspect, when the new node is an idea, the predicted parent node generation portion generates the predicted parent node by inputting the new node into a trained model (M11, M12) that is a neural network trained in advance to generate, when a given idea is input thereinto, a node to be a parent node of the given idea, separately from the nodes in the facilitation structure. When the new node is an evaluation, the predicted parent node generation portion generates the predicted parent node by inputting the new node into a trained model (M13, M14) that is a neural network trained in advance to generate, when a given evaluation is input thereinto, a node to be a parent node of the given evaluation, separately from the nodes in the facilitation structure, and when the new node is an issue, the predicted parent node generation portion generates the predicted parent node by inputting the new node into a trained model (M15, M16) that is a neural network trained in advance to generate, when a given issue is input thereinto, a node to be a parent node of the given issue, separately from the nodes in the facilitation structure.

The neural network is suited to the type of process for generating the ideal parent node without being bound to external data, such as the facilitation structure or the like, and thus, the more appropriate predicted parent node can be generated.

Moreover, by using the neural networks trained so as to output the predicted parent node appropriate to the node corresponding to the type, for the various types of the new node (the idea, the evaluation, and the issue), the more appropriate predicted parent node can be generated.

Further, according to another aspect, a non-transitory computer-readable medium storing program causes a discussion support device to function as a comment acquisition portion configured to acquire, via a communication network, a plurality of comments relating to a main topic of a discussion, and to store the acquired plurality of comments in a storage medium, and a structure creating portion configured to create a facilitation structure on the basis of the plurality of comments acquired and stored by the acquisition portion. The facilitation structure includes the main topic as a root node, and is data representing a tree structure including, as a single node thereof, each of a plurality of ideas, each of a plurality of evaluations, and each of a plurality of issues included in the plurality of comments. The plurality of ideas includes a node representing a proposal to solve one of the main topic to be a parent node and an issue to be a parent node among the plurality of issues. The plurality of evaluations includes a node representing an evaluation of an idea to be a parent node among the plurality of ideas, and the plurality of issues includes a node representing an issue relating to an evaluation to be a parent node among the plurality of ideas. The structure creating portion includes an extraction portion configured to extract the plurality of ideas, the plurality of evaluations, and the plurality of issues from the plurality of comments stored in the storage medium by the comment acquisition portion, an identification portion configured to identify a topology between the plurality of ideas, the plurality of evaluations, and the plurality of issues extracted by the extraction portion, and a recording portion configured to create the facilitation structure so as to realize the topology between the plurality of ideas, the plurality of evaluations, and the plurality of issues identified by the link portion, and to store the facilitation structure in the storage medium. The identification portion includes a predicted parent node generation portion configured to, when one of an idea, an evaluation and an issue is extracted as a new node by the extraction portion, generate a predicted parent node to be a parent node of the new node, separately from the nodes in the facilitation structure, and a high similarity node selection portion configured to select, from the facilitation structure, a node for which a similarity with the predicted parent node is higher than a predetermined reference. The recording portion adds the new node to the facilitation structure as a child node of the node selected by the high similarity node selection portion, and the predicted parent node generation portion generates the predicted parent node by inputting the new node into a trained model that is a neural network trained in advance to generate, when a given node is input thereinto, a node to be a parent node of the given node, separately from the nodes in the facilitation structure. In this way, the same effects as those of claim 1 can be obtained.

Further, according to another aspect, a method of using a discussion support device comprises: comment-acquisitioning to acquire, via a communication network, a plurality of comments relating to a main topic of a discussion, and to store the acquired plurality of comments in a storage medium; and structure-creating to create a facilitation structure on the basis of the plurality of comments acquired and stored by the comment-acquisitioning. The facilitation structure includes the main topic as a root node, and is data representing a tree structure including, as a single node thereof, each of a plurality of ideas, each of a plurality of evaluations, and each of a plurality of issues included in the plurality of comments. The plurality of ideas includes a node representing a proposal to solve one of the main topic to be a parent node and an issue to be a parent node among the plurality of issues, the plurality of evaluations includes a node representing an evaluation of an idea to be a parent node among the plurality of ideas, and the plurality of issues includes a node representing an issue relating to an evaluation to be a parent node among the plurality of ideas. The structure-creating includes extracting to extract the plurality of ideas, the plurality of evaluations, and the plurality of issues from the plurality of comments stored in the storage medium by the comment-acquisitioning, identifying to identify a topology between the plurality of ideas, the plurality of evaluations, and the plurality of issues extracted by the extracting, and recording to create the facilitation structure so as to realize the topology between the plurality of ideas, the plurality of evaluations, and the plurality of issues identified by the identifying, and to store the facilitation structure in the storage medium. The identifying includes a predicted-parent-node-generating to, when one of an idea, an evaluation and an issue is extracted as a new node by the extracting, generate a predicted parent node to be a parent node of the new node, separately from the nodes in the facilitation structure, and a high-similarity-node-selecting to select, from the facilitation structure, a node for which a similarity with the predicted parent node is higher than a predetermined reference. The recording adds the new node to the facilitation structure as a child node of the node selected by the high-similarity-node-selecting. The predicted-parent-node-generating generates the predicted parent node by inputting the new node into a trained model that is a neural network trained in advance to generate, when a given node is input thereinto, a node to be a parent node of the given node, separately from the nodes in the facilitation structure. In this way, the same effects as those of claim 4 can be obtained.

FIG. 1 is a configuration diagram of a communication system according to an embodiment.

FIG. 2 is a block diagram showing a hardware configuration of a discussion support device.

FIG. 3 is a diagram exemplifying a main topic and a plurality of comments relating to a given discussion topic.

FIG. 4 is a flowchart of a discussion support process.

FIG. 5 is a diagram showing an example of a facilitation structure.

FIG. 6 is a flowchart of a process to create the facilitation structure.

FIG. 7 is a diagram showing a trained model that extracts an idea, a favorable point, an unfavorable point, and an issue from a comment.

FIG. 8 is a diagram showing a trained model that outputs predicted parent nodes from nodes.

FIG. 9 is a conceptual diagram of a process to select a root node from a new node that is an idea.

FIG. 10 is a conceptual diagram of a process to select a parent node from a new node that is an idea.

FIG. 11 is a conceptual diagram of a process to select a parent node from a new node that is a favorable point.

FIG. 12 is a conceptual diagram of a process to select a parent node from a new node that is an unfavorable point.

FIG. 13 is a conceptual diagram of a process to select a parent node from a new node that is an issue.

FIG. 14 is a flowchart of a process that performs facilitation on the basis of the facilitation structure.

FIG. 15 is a diagram exemplifying queries generated on the basis of the facilitation structure.

DESCRIPTION OF EMBODIMENTS

Hereinafter, an embodiment of the present invention will be explained. A communication system according to the present embodiment includes a discussion support device 1, a wide area network 2, a plurality of terminals 3 to 6 and the like. The number of the plurality of terminals 3 to 6 is illustrated as only 4 terminals in FIG. 1, but there may be one hundred or more terminals, one thousand or more terminals, one million or more terminals, or one billion or more terminals.

The discussion support device 1 and the plurality of terminals 3 to 6 are connected to the wide area network 2. The wide area network 2 is a communication network covering a wide area, such as the Internet and the like. All transmission and reception performed by the discussion support device 1 via the wide area network 2 is performed using this communication interface 11.

The terminals 3 to 6 may be connected by wire to the wide area network 2 or may be wirelessly connected to the wide area network 2. The wide area network 2 may be a personal computer, a smartphone or a tablet PC. Each of the terminals 3 to 6 transmits, to the discussion support device 1 via the wide area network 2, data of a comment input by a user, as a result of the user operating the terminal.

The discussion support device 1 is a consensus formation support device that manages the progression of a plurality of types of discussion, and supports the organization and progression of the plurality of types of discussion, as well as supporting consensus formation. As shown in FIG. 2, the discussion support device 1 includes the communication interface 11, a RAM 12, a flash memory 13, and a CPU 14. The communication interface 11 is an interface circuit for connecting to the wide area network 2.

The RAM 12 is a volatile storage medium. The flash memory 13 is a non-volatile storage medium. The flash memory 13 may be replaced with a magnetic storage medium. The RAM 12 and the flash memory 13 are both non-transitory tangible storage media.

The CPU 14 executes various programs stored in the flash memory 13, using the RAM 12 as a working memory when executing the programs, and further, performs communication via the wide area network 2 using the communication interface 11.

Hereinafter, operations of a communication system having this kind of configuration will be explained. For each of a plurality of types of discussion, the flash memory 13 of the discussion support device 1 stores text data representing a main topic of the discussion in association with a discussion ID that is a unique identifier for the discussion corresponding to the main topic. The main topic is data representing an underlying issue to be resolved, in the corresponding discussion, such as "How to solve traffic congestion in Nagoya City?"

The CPU 14 may receive the discussion IDs corresponding to the text data of the main topics of these discussions from other devices connected to the wide area network 2, and store the discussion IDs in the flash memory 13. Alternatively, when an operator inputs a main topic of a given discussion into an input device (a keyboard, for example) that is not shown in the drawings and that is connected to the discussion support device 1, text data of the input main topic and the corresponding discussion ID may be stored in the flash memory 13. Note that the stored discussion IDs may be consecutive numbers representing an order in which they are stored in the flash memory 13, or may be other than the consecutive numbers.

Then, the CPU 14 reads out, from the flash memory 13, and executes a display program of a Web server and the like, for example. By executing this display program, the CPU 14 can transmit, to the terminals 3 to 6 via the wide area network 2, the main topics and the discussion IDs stored in the flash memory 13. Specifically, in the execution of the display program, when the CPU 14 receives, via the wide area network 2, data of a predetermined display request from a given one of the terminals, among the terminals 3 to 6, the CPU 14 reads out all the main topics and discussion IDs from the flash memory 13 in accordance with the received display request. Then, the CPU 14 transmits the read out main topics and discussion IDs to the terminal, via the wide area network 2. The terminal that has received these main topics and discussion IDs displays the received main topics on a display portion (a liquid crystal display, for example) that is not shown in the drawings and that is provided in the terminal. In this way, the users of the terminals 3 to 6 can view the main topics of the discussions recorded in the discussion support device 1.

Then, when each of the users of the terminals 3 to 6 wishes to clarify any opinion relating to one of the main topics, among the plurality of main topics viewed by the user, the user operates an operation portion (not shown in the drawings) of the terminal, and, in addition to specifying the one of the main topics, thereafter inputs his/her own comment. When the user does this, text data representing the input comment is generated, and the generated text data and contribution data associated with the discussion ID corresponding to the specified main topic are transmitted to the discussion support device 1 via the wide area network 2.

When the CPU 14 of the discussion support device 1 receives the contribution data transmitted in this manner via the wide area network 2, the discussion support device 1 includes a time stamp in the received contribution data and further, additionally stores the contribution data including the time stamp in the flash memory 13. Here, the time stamp included in the contribution data is a time stamp (a date and time, for example) of a time point at which the contribution data is received by the discussion support device 1.

Further, by executing the above-described display program, the CPU 14 can transmit, to the terminals 3 to 6 via the wide area network 2, the main topic, the discussion ID associated with the main topic, and the contribution data that are stored in the flash memory 13. Specifically, in the execution of the display program, when the CPU 14 receives, via the wide area network 2, data of a display request specifying a particular discussion ID from a given one of the terminals among the terminals 3 to 6, the CPU 14 reads out, from the flash memory 13, the main topic corresponding to the discussion ID, and all the comments corresponding to the discussion ID. Then, the CPU 14 transmits the read out main topic and comments to the terminal, via the wide area network 2. The terminal that has received the main topic and the comments displays the received main topic and comments on a display portion (a liquid crystal display, for example) that is not shown in the drawings and that is provided in the terminal. In this way, the users of the terminals 3 to 6 can view the main topic of the particular discussion and all the comments stored in the discussion support device 1.

A large number of contribution data relating to a plurality of discussion topics are transmitted to the discussion support device 1 from the terminals 3 to 6. Thus, for each of the plurality of discussions, as shown in FIG. 3, a main topic Xs and a plurality of comments Xm of a discussion X are associated with the discussion ID corresponding to that discussion and are stored in the flash memory 13 of the discussion support device 1. In FIG. 3, the discussion ID is represented by Ix.

Further, the CPU 14 of the discussion support device 1 concurrently executes a discussion support process shown in FIG. 4 for the number of the discussions stored in the flash memory 13. The plurality of consensus formation support processes have a one-to-one correspondence with the plurality of types of discussion recorded in the flash memory 13. Each of the plurality of consensus formation support processes is a process to support the formation of consensus in the corresponding discussion. A program for the consensus formation support processes is stored in advance in the flash memory 13. The CPU 14 realizes the processes shown in FIG. 4 by executing this program.

In each of the consensus formation support processes, first, at step S100, the CPU 14 stands by until the new contribution data including the same discussion ID as the corresponding discussion is received via the wide area network 2. When the new contribution data is received, the CPU 14 reads out and acquires the comments in the contribution data.

Next, at step S200, the CPU 14 generates a facilitation structure on the basis of the acquired comments. The facilitation structure corresponding to the given discussion is data representing a tree structure, as shown in FIG. 5. This facilitation structure includes the main topic Xs of the corresponding discussion as a root node. Further, this facilitation structure includes, as single nodes, each of ideas B1 to B6, a plurality of favorable points C1 to C4, a plurality of unfavorable points D1 to D6, and a plurality of issues E1 to E3. All of the favorable points C1 to C4, and the unfavorable points D1 to D6 are also evaluation nodes. By dividing the evaluation into favorable points and unfavorable points in this way, the facilitation structure can be generated in a more complex manner.

The plurality of nodes Xs, B1 to B6, C1 to C4, D1 to D6, and E1 to E3 are connected by a plurality of links. In FIG. 5, the links are represented by arrow lines. Of the plurality of links, each of the links only joins two nodes, namely, a parent node and a child node of the parent node. The leading end of the arrow line is joined to the parent node, and the base of the arrow line is joined to the child node. The parent node is closer to the root node than the child node of that parent node. Note that, closer to the root node means that a number of links to be passed through to reach the root node is smaller. Then, only one of the parent nodes is assigned to each of the child nodes.

Ideas are nodes representing proposals to resolve the main topic Xs or an issue, such as comments like "Increase traffic lanes," and "People going out is not relevant to the problem of traffic congestion." By invalidating the issue of "Won't this mean that more people go out in fact?", the idea B6 of "People going out is not relevant to the problem of traffic congestion" is a proposal to solve the issue. Thus, the main topic Xs, the issues E1 to E3, or the other idea B2 are assigned to be parent nodes of the ideas B1 to B6, and the favorable points and unfavorable points are not assigned to be the parent nodes. When the main topic or the issue is assigned to be the parent node of a given idea, the idea represents a proposal to solve the main topic or the issue. When the separate idea B2 is assigned to be the parent node of the ideas B3 and B4, the ideas B3 and B3 represent ideas that are more specialized or more specific than the idea B2 that is the parent node.

The favorable points C1 to C4 are nodes representing favorable points (namely, good evaluations) of the idea that is the parent node, such as "It seems like more cars will be able to drive on the roads," and "The trains can be easily used." Thus, the ideas B1 to B5 are assigned to be the parent nodes of the favorable points C1 to C4, and none of the main topic, the other favorable points, the unfavorable points, and the issues are assigned to be the parent nodes.

The unfavorable points D1 to C6 are nodes representing unfavorable points (namely, poor evaluations) of the idea that is the parent node, such as "This will impact the management of the private railway companies," and "Construction will incur costs." Thus, the ideas B1 to B5 are assigned to be the parent nodes of the unfavorable points D1 to D6, and none of the main topic, the favorable points, the other unfavorable points, and the issues are assigned to be the parent nodes.

The issues E1 to E3 are nodes representing issues relating to the favorable point that is the parent node thereof or to the unfavorable point that is the parent node thereof, such as "Won't congestion on the trains become a problem'?" and "Is there no way to get corporations involved?" Thus, the favorable points C2 and C3 or the unfavorable point D6 are assigned to be the parent nodes of the issues E1 to E3, and none of the main topic, the ideas, and the issues are assigned to be the parent nodes.

In order to create this kind of facilitation structure, at step S200, the CPU 14 of the discussion support device 1 performs a process shown in FIG. 6. In the process shown in FIG. 6, first, at step S205, the CPU 14 extracts, from the comment (hereinafter referred to as a newly acquired comment) newly acquired at the immediately preceding step S100 relating to the corresponding discussion, zero or more ideas, zero or more favorable points, zero or more unfavorable points, and zero or more issues, as new nodes.

There is a case in which only one of a phrase that is an idea, a phrase that is a favorable point, a phrase that is an unfavorable point, and a phrase that is an issue is included in a given comment. In this case, at step S205, the CPU 14 extracts the one phrase. Here, the phrase refers to a group of words that appear consecutively in the same comment.

For example, it is assumed that a comment "How about increasing the number of traffic lanes?" shown in FIG. 3 is the newly acquired comment. In this comment, a phrase of an idea, namely, "increase traffic lanes," is included. In this case, at step S205, the CPU 14 extracts the phrase of the idea "increase traffic lanes," and does not extract any other phrase.

Further, depending on the newly acquired comment, at step S205, there is also a case in which the CPU 14 extracts a phrase of a favorable point and does not extract any other phrase, a case in which the CPU 14 extracts a phrase of an unfavorable point and does not extract any other phrase, and a case in which the CPU 14 extracts a phrase of an issue and does not extract any other phrase.

Further, at step S205, there is a case in which the CPU 14 extracts a plurality of combinations of a phrase that is an idea, a phrase that is a favorable point, a phrase that is an unfavorable point, and a phrase that is an issue, from the same comment.

The CPU 14 performs this kind of process at step S205 using a trained model configured by a neural network. The trained models used at step S205 are an idea extraction model M01, a favorable point extraction model M02, an unfavorable point extraction model M03, and an issue extraction model M04. The trained models M01 to M04 that are used are stored in advance in the flash memory 13. The favorable point extraction model M02 and the unfavorable point extraction model M03 correspond, respectively, to an example of an evaluation extraction model.

At step S205, the CPU 14 divides the newly acquired comment into a plurality of words (namely, morphemes), using a known morphological analysis process. Then, for each of the obtained plurality of words, the CPU 14 further calculates distributed representation. Although a method for calculating the distributed representation is well known, a known algorithm used in Word2Vec, Glove, or the like may also be employed.

Then, the CPU 14 inputs the distributed representation of the obtained plurality of words into each of the trained models M01 to M04. As a result of this, from the idea extraction model M01, if a phrase corresponding to an idea exists in the new comment, a group of distributed representations of the plurality of words included in that phrase is output. Further, from the favorable point extraction model M02, if a phrase corresponding to a favorable point exists in the new comment, a group of distributed representations of the plurality of words included in that phrase is output. Further, from the unfavorable point extraction model M03, if a phrase corresponding to an unfavorable point exists in the new comment, a group of distributed representations of the plurality of words included in that phrase is output. Further, from the issue extraction model M04, if a phrase corresponding to an issue exists in the new comment, a group of distributed representations of the plurality of words included in that phrase is output. In this way, the groups of distributed representations of the phrases output from the trained models M01 to M04 become new nodes.

A learning method for these trained models M01 to M04 will be described later. Further, a known neural network may be employed as these trained models M01 to M04, such as a bilateral recurrent neural network (RNN), a long short-term memory (LSTM), a convolution neural network (CNN), and the like.

When a person becomes a facilitator and creates the facilitation structure while progressing the discussion, a determination as to whether the obtained comment includes an idea, includes an evaluation with respect to an idea, or includes an issue is made intuitively in many cases. This intuitive determination is a product of extremely complex cognitive operations that are subconsciously performed in the brain of the facilitator, and in related art, it has not been possible for a computer to execute the same determination.

The present inventors, as a method for replacing this determination with a computer, have conceived the idea of a method using the trained models M01 to M04, which are a plurality of neural networks. Specifically, they have conceived the idea of preparing the neural networks trained to output nodes separately corresponding to a type, namely, to ideas, evaluations, and issues, and of using these trained neural networks in the manner described above. By using this type of method, ideas, evaluations, and issues can be appropriately extracted from comments, without relying on human intuition.

Next, the CPU 14 advances from step S205 to step S210, and generates, separately from the nodes in the current facilitation structure, predicted parent nodes corresponding to the new nodes extracted at the immediately preceding step S205 for the corresponding discussion. Generating the nodes separately from the nodes in the current facilitation structure means newly generating the nodes as nodes that have no relationship with the nodes in the current facilitation structure. The CPU 14 performs the process at step S210 in this way using trained models of neural networks. The trained models used at step S205 are trained models M11 to M16 shown in FIG. 8. The trained models M11 to M16 that are used are stored in advance in the flash memory 13.

The trained model M11 is a model that, when a representative distributed representation of an idea is input, outputs a predicted value of the representative distributed representation of an issue that is to be the parent node of that idea (namely, outputs a predicted parent node that is the issue). Here, the representative distributed representation of a given node is a representative value of the distributed representations of the plurality of words included in the phrase represented by that node. A dimensionality of the representative distributed representation is the same as a dimensionality of each of the distributed representations. An average value may be employed as the representative value, for example.

The trained model M12 is a model that, when the representative distributed representation of an idea is input, outputs a predicted value of the representative distributed representation of an idea that is to be the parent node of that idea (namely, outputs a predicted parent node that is the idea). The trained model M13 is a model that, when the representative distributed representation of a favorable point is input, outputs a predicted value of the representative distributed representation of an idea that is to be the parent node of that favorable point (namely, outputs a predicted parent node that is the idea).

The trained model M14 is a model that, when the representative distributed representation of an unfavorable point is input, outputs a predicted value of the representative distributed representation of an idea that is to be the parent node of that unfavorable point (namely, outputs a predicted parent node that is the idea). The trained model M15 is a model that, when the representative distributed representation of an issue is input, outputs a predicted value of the representative distributed representation of a favorable point that is to be the parent node of that issue (namely, outputs a predicted parent node that is the favorable point). The trained model M16 is a model that, when the representative distributed representation of an issue is input, outputs a predicted value of the representative distributed representation of an unfavorable point that is to be the parent node of that idea (namely, outputs a predicted parent node that is the unfavorable point).

When the new node extracted at step S205 is an idea, the CPU 14 inputs the new node into both the trained model M11 and the trained model M12. As a result of this, from the trained model M11, the predicted parent node that is an issue is extracted and from the trained model M12, the predicted parent node that is an idea is extracted.

Further, when the new node extracted at step S205 is a favorable point, the CPU 14 inputs the new node into the trained model M13. As a result of this, from the trained model M13, the predicted parent node that is an idea is extracted. Further, when the new node extracted at step S205 is an unfavorable point, the CPU 14 inputs the new node into the trained model M14. As a result of this, from the trained model M14, the predicted parent node that is an idea is extracted.

Further, when the new node extracted at step S205 is an issue, the CPU 14 inputs the new node into both the trained model M15 and the trained model M16. As a result of this, from the trained model M15, the predicted parent node that is a favorable point is extracted, and from the trained model M16, the predicted parent node that is an unfavorable point is extracted.

A learning method for these trained models M11 to M16 will be described later. Further, a known neural network may be employed as these trained models M11 to M16, such as a bilateral recurrent neural network (RNN), a long short-term memory (LSTM), a convolution neural network (CNN), and the like.

Next, the CPU 14 advances from step S210 to step S215. At step S215, a node having a greatest similarity with the predicted parent node generated at the immediately preceding step S210 for the corresponding discussion is selected from the facilitation structure created for the corresponding discussion at a current time point.

At a time point at which the discussion support device 1 has not yet acquired a comment corresponding to a given discussion, the only node included in the facilitation structure corresponding to that discussion is the root node Xs corresponding to the main topic of that discussion. The data of the root node Xs corresponding to the main topic of that discussion includes the text tata of the phrase configuring the main topic of that discussion, an aggregation of distributed representations of the words configuring the phrase, and the representative distributed representation of the phrase.

In this kind of case, a case is assumed in which, at step S205, the CPU 14 extracts an idea as the new node, and at step S210, the CPU 14 generates the predicted parent node that is an issue, and the predicted parent node that is an idea, as described above. In this case, at step S215, as shown in FIG. 9, the CPU 14 calculates a similarity between the predicted parent node that is the issue and the root node Xs, on the basis of the fact that the only node included in the facilitation structure is the root node. As a similarity index, a cosine similarity between the representative distributed representation of the predicted parent node that is the issue and the representative distributed representation of the root node may be employed, for example, or another similarity index may be employed. The similarity between the predicted parent node and the nodes in the facilitation structure also applies below.

Then, when the similarity between the predicted parent node and the root node is equal to or greater than a reference value, the root node Xs is selected as the parent node of the new node. Further, when the similarity between the predicted parent node and the root node is less than the reference value, the root node Xs is not selected as the parent node of the new node.

FIG. 9 is a conceptual diagram of a process to select the root node Xs as the parent node of the new node that is an idea, when the only node included in the facilitation structure is the root node Xs.

When the only node included in the facilitation structure is the root node, it is assumed that, at step S205, the CPU 14 extracts one of a favorable point, an unfavorable point, or an issue as the new node, and at step S210, the CPU 14 generates the predicted parent node corresponding to that new node. In this case, at step S215, the CPU 14 does not select the parent node of the new node, on the basis of the fact that the only node included in the facilitation structure is the root node.

FIG. 10 is a conceptual diagram of a process to select the parent node, from the new node that is an idea, when a plurality of nodes are included in the facilitation structure. When the plurality of nodes are included in the facilitation structure, a case is assumed in which, at step S205, the CPU 14 extracts an idea as the new node, and at step S210, the CPU 14 generates the predicted parent node that is an issue, and the predicted parent node that is an idea, as described above.

In this case, as shown in FIG. 10, at step S215, the CPU 14 calculates a similarity between the predicted parent node that is to be the issue and the root node Xs, and also calculates a similarity between the predicted parent node that is to be the issue and each of issues included in the facilitation structure. Further, as shown in FIG. 10, at step S215, the CPU 14 calculates a similarity between the predicted parent node that is to be the idea and each of ideas included in the facilitation structure. Thus, a number of calculated similarities is the same as a total number of the root node Xs, the issues, and the ideas included in the facilitation structure.

Then, of the calculated similarities with the root node Xs, the issues, and the ideas, the CPU 14 selects, as the parent node of the new node, the node (namely, the root node Xs, the issue, or the idea) having the similarity greater than the reference value and having the greatest similarity of all. Note that, if all of the calculated plurality of similarities are lower than the above-described reference value, the CPU 14 does not select the parent node of the new node.

FIG. 11 is a conceptual diagram of a process to select the parent node, from the new node that is a favorable point, when a plurality of nodes are included in the facilitation structure. When the plurality of nodes are included in the facilitation structure, a case is assumed in which, at step S205, the CPU 14 extracts a favorable point as the new node, and at step S210, the CPU 14 generates the predicted parent node that is to be an idea, as described above. In this case, as shown in FIG. 11, at step S215, the CPU 14 calculates a similarity between the predicted parent node that is to be the idea and each of ideas included in the facilitation structure. Then, of the calculated similarities, the CPU 14 selects, as the parent node of the new node, the node having the similarity greater than the reference value and having the greatest similarity of all. Note that, if all of the calculated plurality of similarities are lower than the above-described reference value, the CPU 14 does not select the parent node of the new node.

FIG. 12 is a conceptual diagram of a process to select the parent node, from the new node that is an unfavorable point, when a plurality of nodes are included in the facilitation structure. When the plurality of nodes are included in the facilitation structure, a case is assumed in which, at step S205, the CPU 14 extracts an unfavorable point as the new node, and at step S210, the CPU 14 generates the predicted parent node that is to be an idea, as described above. At this time, as shown in FIG. 12, at step S215, the CPU 14 calculates a similarity between the predicted parent node that is to be the idea and each of ideas included in the facilitation structure. Then, of the calculated similarities, the CPU 14 selects, as the parent node of the new node, the node having the similarity greater than the reference value and having the greatest similarity of all. Note that, if all of the calculated plurality of similarities are lower than the above-described reference value, the CPU 14 does not select the parent node of the new node.

FIG. 13 is a conceptual diagram of a process to select the parent node, from the new node that is an issue, when a plurality of nodes are included in the facilitation structure. When the plurality of nodes are included in the facilitation structure, a case is assumed in which, at step S205, the CPU 14 extracts an issue as the new node, and at step S210, the CPU 14 generates the predicted parent node that is to be a favorable point and the predicted parent node that is to be an unfavorable point, as described above.

In this case, as shown in FIG. 13, at step S215, the CPU 14 calculates a similarity between the predicted parent node that is to be the favorable point and each of favorable points included in the facilitation structure. Further, as shown in FIG. 13, the CPU 14 calculates a similarity between the predicted parent node that is to be the unfavorable point and each of unfavorable points included in the facilitation structure.

Then, of the calculated similarities with the favorable points and the unfavorable points, the CPU 14 selects, as the parent node of the new node, the node having the similarity greater than the reference value and having the greatest similarity of all (namely, the favorable point or the unfavorable point). Note that, if all of the calculated plurality of similarities are lower than the above-described reference value, the CPU 14 does not select the parent node of the new node.

By performing the processes in this way, at step S215, for the new node, one of the nodes present in the existing facilitation structure is selected as the parent node of the new node. In this way, a parent-child relationship is identified between the node present in the existing facilitation structure and the new node.

When a person acts as a facilitator and creates a facilitation structure while progressing a discussion, with respect to a new node corresponding to an idea, an evaluation, or an issue extracted from a comment, the person determines of which of the nodes present in the facilitation structure the new node is to become a child node. In many cases, this determination is made intuitively. This intuitive determination is a product of extremely complex cognitive operations that are subconsciously performed in the brain of the facilitator, and in related art, it has not been possible for a computer to execute the same determination. Moreover, while this type of intuitive operation is possible in a discussion where a total number of comments is around less than 50, when the total number of comments becomes 100 or more, or 1000 or more, or the like, the facilitation structure becomes too complex, and can certainly no longer be handled by a person.

The present inventors, as a method for replacing this determination with a computer, have conceived the idea of not directly selecting the parent node of the new node corresponding to the idea, the evaluation, or the issue, but of performing the selection through an indirect process.

Specifically, the idea has been conceived that, when the idea, the evaluation, or the issue is extracted as the new node, the predicted parent node that is to be the parent node of the new node is generated separately from the nodes in the facilitation structure. In other words, the idea has been conceived to first create the predicted parent node as an ideal parent node, independently of the nodes in the facilitation structure. Then, the idea has been conceived to extract the parent node to which the new node is to be connected, on the basis of the similarity with the predicted parent node generated in this way.

The present inventors have verified, through assessment, that the generating of the ideal parent node for the new node without being bound to the nodes in the facilitation structure is relatively simple for a computer. Thus, by employing the indirect method of generating the ideal parent node without being bound to the nodes in the facilitation structure, it is possible to appropriately select the parent node from the facilitation structure appropriately, without relying on human intuition.

Further, the neural network is suited to the type of process for generating the ideal parent node without being bound to external data, such as the facilitation structure or the like, and thus, the more appropriate predicted parent node can be generated.

Moreover, by using the neural networks trained so as to output the predicted parent node appropriate to the node corresponding to the type, for the various types of the new node (the idea, the evaluation, and the issue), the more appropriate predicted parent node can be generated. Moreover, in contrast to a person, even if the total number of comments to be acquired is 100 or more, 1000 or more, or 10000 or more, the CPU 14 can perform the above-described processes without any particular problem.

Next, at step S220, the CPU 14 adds the new node to the facilitation structure such that the new node becomes the child node of the node selected as the parent node at the immediately preceding step S215 for the corresponding discussion. At this time, together with the new node to be added, the CPU 14 stores a time stamp associated with that new node in the flash memory 13. Here, the stored time stamp is a time stamp of the contribution data including the phrase indicated by the new node with which the time stamp is associated.

In this way, content of the facilitation structure in the flash memory 13 is overwritten. As a result of this, the new node becomes a child node of an existing node. Note that the time stamp associated with the child node in the facilitation structure indicates a time point after the time stamp associated with the corresponding parent node.

Note that, when the parent node of the new node is not selected at the immediately preceding step S215 for the corresponding discussion, at step S220, the new node is not added to the facilitation structure. When step S220 is ended, the process at step S200 shown in FIG. 4 is ended.

Next, following step S200, at step S300, the CPU 14 performs consensus determination for a target discussion. In the consensus determination, the CPU 14 determines whether or not a consensus condition has been met, that is, determines whether or not the target discussion has been sufficiently debated. The consensus condition is used as an ending condition of the discussion.

A condition that a time period from the start of the target discussion has exceeded a reference time period may be used as the consensus condition. Here, a time point at which the target discussion starts may be a time point at which the main topic Xs of that discussion becomes viewable using the terminals 3 to 6, or may be a time point at which the CPU 14 of the discussion support device 1 receives the first contribution data corresponding to that discussion. The time point at which the first contribution data is received can be identified from the time stamp of an earliest time point, among the time stamps included in the contribution data corresponding to that discussion.

Further, a condition that a number of ideas in the facilitation structure of the target discussion has exceeded a reference number may be used as the consensus condition. Further, a condition that a number of issues in the facilitation structure of the target discussion has exceeded a reference number may be used as the consensus condition.

Further, a condition that a shape of the facilitation structure for the target discussion is sufficiently uniform and that a complexity of the facilitation structure has exceeded a reference value may be used as the consensus condition. Whether or not the shape of the facilitation structure is sufficiently uniform may be determined, for example, by determining that the shape is sufficiently uniform when a degree of variation (a standard deviation, for example) from an average value of a depth of all of leaf nodes is smaller than a reference value, and determining that the shape is not sufficiently uniform when the degree of variation is equal to or greater than the reference value.

Further, whether or not the shape of the facilitation structure is sufficiently uniform may be determined, for example, by determining that the shape is sufficiently uniform when a degree of variation (a standard deviation, for example) from an average value of a number of branches of all the nodes is smaller than a reference value, and determining that the shape is not sufficiently uniform when the degree of variation is equal to or greater than the reference value.

Here, the leaf node refers to a node for which there is no child node. Further, the depth of the leaf node refers to a number of links passed through from that leaf node to reach the root node. Further, the number of branches of the node refers to the number of child nodes of that node.

Further, the complexity of the facilitation structure may be a depth of the node that has the greatest depth in the facilitation structure, or may be a total number of the nodes included in the facilitation structure. Any kind of index may be employed as the complexity of the facilitation structure, as long as the index becomes larger the more complex the facilitation structure becomes.

Note that the consensus condition may be set to be different for each discussion. While there is a case in which it is desired to conduct a wide and shallow discussion, there is also a case in which it is desired to conduct a narrow and deep discussion. Which type of consensus condition is set for the discussion may be determined by a person, or may be automatically determined.

When it is determined at the immediately preceding step S300 that the consensus condition is not satisfied for the corresponding discussion, at step S400, the CPU 14 advances to step S500, and when it is determined that the consensus condition is satisfied, the CPU 14 advances to step S600.

At step S500, facilitation is performed on the basis of the created facilitation structure. In other words, in order to guide the corresponding discussion and prompt the users of the terminals 3 to 6 to create comments, a query is created such that the query can be transmitted to the terminals 3 to 6 via the wide area network 2. Note that the process at step S500 may be performed each time a new comment is acquired for the corresponding discussion, or alternatively, may only be performed each time the new comments are acquired a predetermined number of wait times (10 times, for example).

Hereinafter, the process at step S500 will be explained. As shown in FIG. 14, at step S500, the CPU 14 first, at step S510, extracts a node under consideration from the facilitation structure of the corresponding discussion.

The node under consideration is a node used for creating the query based on the node under consideration. From a given viewpoint, the node under consideration is a node that is expected to deepen the discussion as a result of a child node being added to that node under consideration. From another viewpoint, the node under consideration is a node for which there is a high possibility of a child node being added to that node under consideration.

The node under consideration in the facilitation structure is, for example, the following type of node:
(1) An issue for which there is no child node that is an idea
(2) An idea for which there is no child node that is a favorable point
(3) An idea for which there is no child node that is an unfavorable point
(4) A leaf node for which a child node is not generated even after a predetermined allotted time period elapses following the generation of the leaf node A node that corresponds to any one of these conditions (1) to (4) is extracted as the node under consideration. Here, descendant nodes of a given node refer to all nodes that can be reached by following links in an opposite direction to a direction from the given node to the root node. For example, the descendant nodes of the node B5 shown in FIG. 5 are the nodes C4, D5, D6, and E3. Further, ancestor nodes of a given node refer to all nodes that can be reached by following links in the direction from the given node to the root node. Further, the allotted time period referred to in condition (4) may be, for example, a time period of one hour or more, a time period of two days or more, a time period of one week or more, or the like. Note that a generation time point of a node can be verified using the time stamp associated with that node.

For example, a case is assumed in which the facilitation structure of the corresponding discussion is as shown in FIG. 15. In FIG. 15, a node A is the root node, nodes B, C, J, K, and L are nodes corresponding to ideas, nodes D, F, and G are nodes corresponding to favorable points, a node E is a node corresponding to an unfavorable point, and nodes H, I, and M are nodes corresponding to issues. Connection relationships of these nodes are as shown by links represented by arrow lines.

In the facilitation structure shown in FIG. 15, the issue M is an issue for which there is no child node that is an idea, and thus, the issue M corresponds to the above-described condition (1). Further, the idea C is an idea for which there is no child node that is an unfavorable point, and thus, the idea C corresponds to the above-described condition (3). Thus, the issue M and the idea C are extracted as the nodes under consideration.

Further, in the facilitation structure shown in FIG. 15, a discussion relating to the idea of the node L has stagnated, and it is assumed that a child node of the node L has not been generated even though the above-described allotted time period has elapsed following the generation of the node L. In this case, the node L is extracted as the node under consideration corresponding to condition (4).

Next, at step S520, for each of the nodes under consideration extracted at the immediately preceding step S510 for the corresponding discussion, the CPU 14 generates the query in accordance with the node under consideration. Specifically, the CPU 14 generates the query by applying the phrase represented by the node under consideration to a predetermined template. The template is a fixed phrase and is stored in advance in the flash memory 13.

For example, the template corresponding to the node under consideration extracted as a result of corresponding to the above-described condition (1) is a template reading "Do you have an idea relating to issue Y?" and the phrase represented by that node under consideration ("Is there no way to get corporations involved?" for example) is applied to the portion "Y." Specifically, the query becomes "Do you have an idea relating to the issue "Is there no way to get corporations involved?"" In this way, the query is a sentence asking for an idea relating to a specific issue that is the node under consideration. The query pertaining to the node under consideration M in FIG. 15 is also generated in this manner. In this way, by creating, as the query, the sentence that asks for an idea relating to the issue for which there is no child node that is an idea, it is possible to convey to the user an area in which there is still room to progress the discussion. Thus, it is possible to effectively prompt the progression of the discussion.

Further, for example, the template corresponding to the node under consideration extracted as a result of corresponding to the above-described condition (2), is a template reading "Do you have a favorable point relating to the idea YT" and the phrase represented by that node under consideration is applied to the portion "Y." In this way, the query is a sentence asking for a favorable point relating to a particular idea that is the node under consideration. In this way, by creating, as the query, the sentence that asks for a favorable point relating to the idea for which there is no child node that is a favorable point, it is possible to convey to the user an area in which there is still room to progress the discussion. Thus, it is possible to effectively prompt the progression of the discussion.

Further, for example, the template corresponding to the node under consideration extracted as a result of corresponding to the above-described condition (3), is a template reading "Do you have an unfavorable point relating to the idea Y?" and the phrase represented by that node under consideration is applied to the portion "Y." In this way, the query is a sentence asking for an unfavorable point relating to a particular idea that is the node under consideration. The query pertaining to the node under consideration C in FIG. 15 is also generated in this manner. In this way, by creating, as the query, the sentence that asks for an unfavorable point relating to the idea for which there is no child node that is an unfavorable point, it is possible to convey to the user an area in which there is still room to progress the discussion. Thus, it is possible to effectively prompt the progression of the discussion.

Further, for example, the template corresponding to the node under consideration extracted as a result of corresponding to the above-described condition (4), is a template reading "The discussion has stalled. The original discussion was relating to V:W, so let's return to that and discuss." Then, a type (idea, for example) of a particular ancestor node (the node C, for example) of the node under consideration is applied to the portion "V." Further, a phrase represented by that ancestor node is applied to the portion "W." In this way, the query is a sentence prompting a comment based on the ancestor node of the node under consideration. The query pertaining to the node L in FIG. 15 is also generated in this manner. In this way, with respect to a leaf node for which a child node is not generated even after a predetermined allocated time period has elapsed from the generation of the leaf node, by creating, as the query, a sentence that prompts a comment that returns to an ancestor node of that leaf node, support can be given to once more progress the discussion that has stalled.

Note that, as the particular ancestor node of the node under consideration, the CPU 14 may use an idea node that is closest to the node under consideration, among all the ancestor nodes of the node under consideration. Alternatively, as the particular ancestor node of the node under consideration, the CPU 14 may use, for example, an issue node that is closest to the node under consideration, among all the ancestor nodes of the node under consideration. Note that the node closest to the node under consideration refers to the node for which the number of links to be passed through to reach the closest node from the node under consideration is smallest.

Alternatively, when the same leaf node repeatedly becomes the node under consideration relating to the above-described condition (4), a node selected as the particular ancestor node of that node under consideration may be away from that node under consideration by one stage at a time, each time that node under consideration is selected. One stage refers to passing through one link.

Next, at step S530, the CPU 14 determines whether or not each of the one or more queries generated at the immediately preceding step S520 for the corresponding discussion has validity. Specifically, syntactic analysis is performed on the query that is a target of determining the validity. In other words, morphological analysis is performed on the query, the query is divided into a plurality of words, and parts of speech of the plurality of words are identified. Then, dependency relationships between these parts of speech are identified, and further, a subject and a predicate are identified. Then, when there is an abnormality in this syntactic analysis, it is determined that the query does not have validity, and when there is no abnormality, it is determined that the query has validity. The abnormality in the syntactic analysis refers to a state that does not follow grammatical rules, such as the subject cannot be identified, a plurality of predicates are identified, a verb cannot be identified, there is an adjective without a modified part, or the like.

Alternatively, the CPU 14 may use trained validity determination models configured by a neural network, and may determine whether or not each of the queries has validity. The trained validity determination models are stored in advance in the flash memory 13.

In this case, at step S530, the CPU 14 inputs, into the trained validity determination models, a group of distributed representations of a plurality of words included in the query. In this way, the validity determination models output a determination result as to whether the query has validity or does not have validity.

A learning method for these trained validity determination models will be described later. Further, a known neural network may be employed as these trained validity determination models, such as a bilateral recurrent neural network (RNN), a long short-term memory (LSTM), a convolution neural network (CNN), and the like.

At step S540, the CPU 14 contributes, as a comment relating to the corresponding discussion, the query determined to have validity at the immediately preceding step S530 for the corresponding discussion. Specifically, for each of the one or more queries determined to have validity at the immediately preceding step S530, the CPU 14 includes a time stamp of a current time point in the contribution data in which the text data of the query and the discussion ID of the corresponding discussion are associated with each other, and stores the contribution data in the flash memory 13. Note that the contribution data generated in this way by the discussion support device 1 and stored in the flash memory 13 is not used in the creation of the facilitation structure at step S200 shown in FIG. 4. After step S540, the CPU 14 ends the process at step S500. After step S500, the CPU 14 returns to step S100, and stands by until the next comment in the corresponding discussion is contributed via the wide area network 2.

In this way, the contribution data of the query generated by the discussion support device 1 at step S500 and recorded in the flash memory 13 is transmitted to the terminals 3 to 6 via the wide area network 2, as a result of the discussion support device 1 executing the display program described above. Thus, the contribution data of the query can be viewed using the terminals 3 to 6, similarly to the other contribution data. As a result, the users of the terminals 3 to 6 are prompted by the contributed query, and it becomes possible to more easily think of a comment that will lead the discussion and deepen the discussion further.

On the other hand, at step S600 after it is determined that the consensus condition is satisfied, the CPU 14 ends the corresponding discussion. More specifically, the CPU 14 associates text data indicating that the discussion has ended with the discussion ID of the corresponding discussion, and stores the text data as the contribution data in the flash memory 13. The text data indicating that the discussion has ended may be text data of a character string reading "This discussion has ended", for example.

In this way, the contribution data indicating that the discussion has ended is transmitted to the terminals 3 to 6 via the wide area network 2, as a result of the discussion support device 1 executing the display program described above. Thus, the contribution data indicating that the discussion has ended can be viewed using the terminals 3 to 6, similarly to the other contribution data. Further, the CPU 14 discards the contribution data including the discussion ID of the corresponding discussion that is received from this point onward, and does not store the contribution data in the flash memory 13. In other words, the CPU 14 ends reception of comments relating to the corresponding discussion.

In this manner, the discussion support device 1 can select an ending timing of the discussion in accordance with the content of the discussion, by determining whether or not the consensus condition is satisfied, on the basis of the facilitation structure. Further, as described above, on the basis of the fact that the consensus condition is satisfied, the discussion support device 1 creates the data indicating that the discussion has ended, such that the data can be transmitted via the wide area network 2. In this way, discussion guidance can be performed using a format in which the ending of the discussion is notified.

Further, at step S600, the CPU 14 may allow the facilitation structure of the current time point to be viewed using the terminals 3 to 6. Specifically, the CPU 14 associates image data representing the facilitation structure of the current time point with the discussion ID of the corresponding discussion and stores the associated data in the flash memory 13. In this way, the image data representing the facilitation structure of the current time point is contributed as a comment relating to the corresponding discussion. Thus, this image data can be viewed using the terminals 3 to 6, similarly to the other contribution data, as a result of the discussion support device 1 executing the display program described above.

As described above, before it is determined at step S400 that the consensus condition is satisfied, the CPU 14 of the discussion support device 1 repeats the processes at steps S100, S200, S330, S400 and S500, in this order.

In the course of this repetition, by repeating step S100 a plurality of times, a plurality of comments Xm relating to the main topic Xs of the corresponding discussion are acquired via the wide area network 2, and the acquired plurality of comments Xm are stored in the flash memory 13. By repeatedly executing step S100, the CPU 14 functions as a comment acquisition portion.

Further, in the course of this repetition, the facilitation structure is created on the basis of the plurality of comments Xm stored in the flash memory 13. By repeatedly executing step S200, the CPU 14 functions as a structure creating portion and a structure acquisition portion.

More specifically, as a result of step S205 being repeatedly executed, a plurality of ideas, a plurality of evaluations, and a plurality of issues are extracted from the plurality of comments Xm stored in the flash memory 13. By repeatedly executing step S205, the CPU 14 functions as an extraction portion.

Further, as a result of steps S210 and S215 being repeatedly executed, a topology is identified between the plurality of ideas, the plurality of evaluations, and the plurality of issues. In other words, the topology between the plurality of nodes in the facilitation structure is identified. The topology between the plurality of nodes refers to the topology obtained via the links between the plurality of nodes, that is, the parent-child relationships between the plurality of nodes.

Further, as a result of step S220 being repeatedly executed, the facilitation structure is created such that the topology is realized between the plurality of ideas, the plurality of evaluations, and the plurality of issues, and is stored in the flash memory 13. By repeatedly executing step S220, the CPU 14 functions as a recording portion.

Further, by executing step S300, the CPU 14 functions as a determination portion, by executing step S500, the CPU 14 functions as a guidance portion, and by executing step S600, the CPU 14 functions as an ending portion. Further, by executing step S210, the CPU 14 functions as a predicted parent node generation portion, and by executing step S215, the CPU 14 functions as a high similarity node selection portion.

In this way, the discussion support device 1 extracts the plurality of ideas, the plurality of evaluations, and the plurality of issues from the plurality of comments, and generates a tree structure, namely, the facilitation structure, including these as the nodes thereof and also having the main topic of the discussion as the root node thereof. The facilitation structure created in this manner is a structure for problem solving of the mutually related plurality of ideas, plurality of evaluations, and plurality of issues. Thus, by creating the facilitation structure, the discussion support device 1 can support the organization and progression of the discussion.

Here, a method for creating the trained models M01 to M04 shown in FIG. 7 will be explained. The trained models M01 to M04 may be created by the discussion support device 1, or may be created by a computer other than the discussion support device 1. Here, the explanation will be made of a case in which the discussion support device 1 creates the trained models M01 to M04, but the same applies to a case in which the computer other than the discussion support device 1 creates the trained models M01 to M04.

First, a creator of the trained models M01 to M04 creates teaching data and stores the teaching data in the flash memory 13. The teaching data includes text data of a plurality of comments (a thousand comments or more, a million comments or more, a billion comments or more, for example), and first type annotation data corresponding to each of the text data of the plurality of comments.

Each of the first type annotation data includes information indicating a phrase corresponding to an idea, information indicating a phrase corresponding to a favorable point, information indicating a phrase corresponding to an unfavorable point, and information indicating a phrase corresponding to an issue, in the text data of a target comment.

The CPU 14 may acquire the text data of the comments configuring the teaching data from another SNS server, via the wide area network 2, for example, and may store the acquired text data in the flash memory 13. SNS is an abbreviation of social networking service. For each of the first type annotation data, a person may create the first type annotation data on the basis of understanding the meaning of the text data of the corresponding comment, and may input the first type annotation data into the discussion support device 1 using an input device (not shown in the drawings). In this case, the CPU 14 of the discussion support device 1 stores the input first type annotation data in the flash memory 13 in association with the corresponding comment.

The CPU 14 uses the teaching data prepared in this manner to train the trained models M01 to M04. For this reason, neural networks corresponding to pre-training models of the trained models M01 to M04 are stored as the pre-training models in the flash memory 13.

Specifically, when creating the trained model M01, the CPU 14 causes supervised learning to be carried out with respect to a neural net having the same structure as the above-described pre-training model. Specifically, for each of the plurality of comments in the teaching data stored in the flash memory 13, the comment is an input and the phrase of the idea indicated by the first type annotation data corresponding to the comment is correct answer data of an output, and the CPU 14 causes the learning to be performed using an error back-propagation method or the like. In this way, the trained model M01 is created.

Note that a data format of the comment used as the input is a group of distributed representations of a plurality of words included in the comment. Further, the data format of the phrase used as the correct answer data is a group of distributed representations of a plurality of words included in the phrase.

The same learning method as that of the trained model M01 is used to create the trained models M02, M03, and M04 also, apart from the fact that the correct answer data of the output is not the phrase of the idea, but is a phrase of a favorable point, an unfavorable point, and an issue indicated by the first type annotation data, respectively.

Next, a method of creating the trained models M11 to M16 shown in FIG. 8 will be explained. The trained models M11 to M16 may be created by the discussion support device 1, or may be created by a computer other than the discussion support device 1. Here, the explanation will be made of a case in which the discussion support device 1 creates the trained models M11 to M16, but the same applies to a case in which the computer other than the discussion support device 1 creates the trained models M11 to M16.

First, a creator of the trained models M11 to M16 creates teaching data and stores the teaching data in the flash memory 13. The teaching data includes text data of a plurality of comments (a thousand comments or more, a million comments or more, a billion comments or more, for example), and second type annotation data corresponding to each of the text data of the plurality of comments.

Each of the second type annotation data includes information indicating a phrase corresponding to an idea, information indicating a phrase corresponding to a favorable point, information indicating a phrase corresponding to an unfavorable point, and information indicating a phrase corresponding to an issue, in the text data of a target comment.

Further, each of the second type annotation data includes information of a parent node of the phrase corresponding to the idea, information of a parent node of the phrase corresponding to the favorable point, information of a parent node of the phrase corresponding to the unfavorable point, and information of a parent node of the phrase corresponding to the issue, in the text data of the target comment. Here, the information of the parent node of a given phrase is information indicating which of the phrases of the comment the parent node of the phrase corresponds to. In other words, the information of the parent node of the given phrase indicates a position of the parent node of the phrase in the teaching data.

The CPU 14 may acquire the text data of the comments configuring the teaching data from another SNS server, via the wide area network 2, for example, and may store the acquired text data in the flash memory 13. For each of the second type annotation data, a person may create the facilitation structure from all of the comments, may create the second annotation data on the basis of that facilitation structure, and may input the second annotation data into the discussion support device 1 using an input device (not shown in the drawings). In this case, the CPU 14 of the discussion support device 1 stores the input second type annotation data in the flash memory 13 in association with the corresponding comment.

The CPU 14 uses the teaching data prepared in this manner to train the trained models M11 to M16. For this reason, neural networks corresponding to pre-training models of the trained models M11 to M16 are stored as the pre-training models in the flash memory 13.

Specifically, when creating the trained model M11, the CPU 14 causes supervised learning to be carried out with respect to a neural net having the same structure as the above-described pre-training model. Specifically, in the teaching data stored in the flash memory 13, the phrase of the idea is the input and a phrase of an issue corresponding to a parent node of the idea is the correct answer data of the output, and the CPU 14 causes the learning to be performed using the error back-propagation method or the like. In this way, the trained model M11 is created.

Note that a data format of the comment used as the input is distributed representations of a plurality of words included in the comment. Further, the data format of the phrase used as the correct answer data is a representative distributed representation of a plurality of words included in the phrase.

The same learning method as that of the trained model M11 is used to create the trained model M12 also, apart from the fact that, rather than the phrase of the issue, a phrase of an idea corresponding to the parent node is used as the correct answer data of the output.

The same learning method as that of the trained model M11 is used to create the trained model M13 also, apart from the fact that a phrase of a favorable point is input rather than the phrase of the idea, and rather than the phrase of the issue, a phrase of an idea corresponding to the parent node is used as the correct answer data of the output. The same learning method as that of the trained model M11 is used to create the trained model M14 also, apart from the fact that a phrase of an unfavorable point is input rather than the phrase of the idea, and rather than the phrase of the issue, a phrase of an idea corresponding to the parent node is used as the correct answer data of the output.

The same learning method as that of the trained model M11 is used to create the trained model M15 also, apart from the fact that a phrase of an issue is input rather than the phrase of the idea, and rather than the phrase of the issue, a phrase of a favorable point corresponding to the parent node is used as the correct answer data of the output. The same learning method as that of the trained model M11 is used to create the trained model M16 also, apart from the fact that a phrase of an issue is input rather than the phrase of the idea, and rather than the phrase of the issue, a phrase of an unfavorable point corresponding to the parent node is used as the correct answer data of the output.

Next, a method of creating the trained validity determination models used at step S530 shown in FIG. 14 will be explained. The trained validity determination models may be created by the discussion support device 1, or may be created by a computer other than the discussion support device 1. Here, the explanation will be made of a case in which the discussion support device 1 creates the trained validity determination models, but the same applies to a case in which the computer other than the discussion support device 1 creates the trained validity determination models.

First, a creator of the trained validity determination models creates teaching data and stores the teaching data in the flash memory 13. The teaching data includes text data of a plurality of queries (a thousand queries or more, a million queries or more, a billion queries or more, for example), and data indicating, for each of the plurality of queries, whether the query has validity or does not have validity. Some of the plurality of queries have validity, and thus, are associated with the data indicating that there is validity. The remaining queries of the plurality of queries do not have validity, and thus, are associated with the data indicating that there is no validity. These teaching data may be created by the above-described creator, for example, or the CPU 14 may acquire the teaching data via the wide area network 2 and store the teaching data in the flash memory 13.

The CPU 14 uses the teaching data prepared in this manner to train the validity determination model. For this reason, neural networks corresponding to pre-training models of the validity determination model are stored as the pre-training models in the flash memory 13.

Specifically, when creating the validity determination model, the CPU 14 causes supervised learning to be carried out with respect to a neural net having the same structure as the trained validity determination model. Specifically, for each of the plurality of queries in the teaching data stored in the flash memory 13, the query is an input and the data indicating the validity or lack of validity associated with the query is the correct answer data of an output, and the CPU 14 causes the learning to be performed using the error back-propagation method or the like. In this way, the trained validity determination model is created.

Advantages of the discussion support device 1 described above and a communication system including the discussion support device 1 will be explained below with respect to related art. In the present embodiment, the communication system is realized that supports the organization and progression of a discussion among a crowd of people on the wide area network 2, such as the Internet or the like.

In recent years, it has become possible to gather the opinions of several tens of thousands of people or of several millions of people on the Internet, using an SNS, such as Twitter (registered trademark), Facebook (registered trademark), or the like. It is possible to successfully gather and summarize these opinions and to support the organization and progress of the discussion between several millions of people, and to form a consensus. If a large-scale consensus can be formed, it becomes possible to perform decision making by a large number of people, which has previously not been possible.

When attempting to form a consensus from the position of a facilitator, the facilitator sometimes has the experience of thinking "If I hadn't said that, things may have gone better," or "I wish I had done that," or similar mistakes. In order not to make such mistakes, automated negotiation simulation is known to practice negotiating with various counterparts. However, consensus obtained through an existing automated negotiation simulation is a product of compromise. In the automated negotiation simulation, it is only possible to search for consensus under conditions that are provided in advance.

In order to support the organization and progress of a discussion, a more creative perspective is necessary. This is because, if there is not a creative perspective, in a confrontational situation, however much a negotiation or a discussion is continued, the confrontation continues, and it becomes even more impossible to find a favorable consensus. For example, a case is assumed that, when deciding a travel destination for a family in the summer this year, the mother wants to go to Hawaii and the father wants to go to Boston. If there is no creative perspective, it is only possible to select either of the options by analyzing cost, attraction, the region, and the like. Whichever is decided upon, the feelings of either the mother or the father are hurt. If there is a creative perspective, for example, it also becomes possible to create a meta-level consensus, such as prioritizing the opinion of the mother this year while prioritizing the opinion of the father the following year. The discussion support device 1 of the present embodiment creates the facilitation structure from the comments of the crowd of people that are the users of the terminals 3 to 6, and can organize creative perspectives included in the comments.

Further, Innocentive, Quola, and the like exist as systems to support the gathering or question answering of the ideas of a crowd of people, but the main focus is on generating ideas, and these systems do not aim to go as far as supporting the organization and progression of a discussion on the basis of opinions and preferences. For example, when deciding a travel destination, even if many candidates for places someone wishes to visit are listed, the organization and progression of the discussion is not performed. In addition to supporting the generation of many ideas, it is necessary to guide those ideas on the basis of preferences and opinions with respect to those ideas. This becomes possible with the discussion support device 1 of the present embodiment.

Deliberatorium (refer to Non-Patent Literature 3, 4 and 5), is known as a system that supports deliberation among a crowd of people. However, in this system, it is necessary for the crowd to develop the deliberation on the basis of a prescribed structure, and deliberation using freely natural language is not possible. When deliberating on the basis of the prescribed structure, it is necessary for all of the users to have a deep understanding of that structure. In existing research, in order to develop deliberation appropriately using Deliberatorium, progression of the deliberation is forced on the basis of the structure. In contrast to this, with the discussion support device 1 of the present embodiment, the user can contribute a freely expressed comment without being bound by the structure of the discussion. When there is free expression, it is possible to also make comments that prompt the comments of participants, such as jokes or the like, but this is not possible with Deliberatorium.

Further, in the 1990s, support systems of consensus formation using case-based reasoning of artificial intelligence were developed, such as PERSUADER (refer to Non-Patent Literature 6 and 7) and JUDGE (refer to Non-Patent Literature 8). However, these are designed to support consensus formation in a particular domain, and are not content that targets a large number of people on the Internet. Further, these do not create a facilitation structure.

The discussion support device 1 of the present embodiment realizes a system that supports the organization and progression of a discussion on the basis of opinions and preferences of a crowd of people on the wide area network 2. As shown by the examples above, for example, when deciding a travel destination, even if many candidates for places one wishes to visit are listed, the organization and progression of the discussion cannot be supported. In addition to the generation of many ideas, it is necessary to support the organization and the progression of the discussion on the basis of the preferences and opinions with respect to those ideas. Then, in order to support the organization and progression of the discussion of the crowd of people, a facilitator agent that mediates a discussion of a crowd of people on a large-scale and in a rapid manner, and that supports the organization and progression of a more creative discussion is the discussion support device 1 of the present embodiment.

By extracting a problem solving structure (that is, a facilitation structure) in the discussion on a large-scale and in a rapid manner, using a problem solving structuring method that obtains hints from IBIS (refer to Non-Patent Literature 9 and 10), which is one of a facilitation technique, the discussion support device 1 of the present embodiment can support the organization and progression of the creative discussion of a crowd of people.

Argumentation Mining (refer to Non-Patent Literature 11) is known as a method for extracting a structure itself of a discussion. However, almost all of this research extracts a structure of a theoretical discussion, and even if the extraction can be effectively performed, a confrontation remains a confrontation, and it is thought to be difficult to obtain a consensus. In order to form a consensus, it is not sufficient to simply extract a current structure of the discussion, and it is thought to be important to simultaneously extract a problem solving structure while achieving interaction of creative consensus proposals with a crowd of people and thus form the consensus.

On the basis of a new consensus structure representation technique that obtains hints from the IBIS technique, which is a representative methodology of creative facilitation, the discussion support device 1 of the present embodiment can support the organization and the progression of the discussion by extracting a problem solving structure while mediating the discussion. Note that the IBIS technique of related art is known as a technique that is performed manually by a person in order to gather opinions of a small number of people in a limited space, such as a meeting room, and its use in a large-scale discussion with a crowd of people via the wide area network 2 has not been considered at all.

Note that in Patent Literature 1, a discussion support device is described that has a function to calculate, on the basis of respective opinions of a plurality of opinion leaders, an optimum solution of each of the opinion leaders, and a function to cause general participants to vote for the opinion leader that they instruct. Further, in Patent Literature 2, for a target problem, in consensus forming of a discussion by a plurality of opinion leaders and opinions of general participants with respect to the discussion, a discussion support device is described that supports an analysis of the opinions of the general participants. In both Patent Literature 1 and 2, a facilitation structure is not described.

OTHER EMBODIMENTS

Note that the present invention is not limited to the above-described embodiment, and modifications are possible as appropriate. Further, in the above-described embodiment, elements configuring the embodiment are not necessarily necessary, unless particularly clarified as being necessary or thought to be clearly necessary in principle. Further, in the above-described embodiment, where a numerical value of a number, a numerical value, a quantity, a range or the like of the structural element of the embodiment is referred to, apart from a case in which it is clearly indicated that it is particularly necessary, or a case in which it is clearly limited to a particular number in principle, the present invention is not limited to that particular number. In particular, when values of a plurality of structural elements are exemplified for a certain quantity, apart from a case in which there is a particular separate description or a case in which it is clearly impossible in principle, a value between the values of those plurality of structural elements can also be used. Further, with respect to the above-described embodiment, the present invention also permits modified examples such as those described below or modified examples in a uniform range. Note that it is possible to select each of the following modified examples independently, to be applied, or not to be applied to the above-described embodiment. In other words, apart from a combination in which there is a clear contradiction among the following modified examples, a desired combination thereof can be applied to the above-described embodiment.

Modified Example 1

In the above-described embodiment, the facilitation structure is automatically created by the discussion support device 1. However, the facilitation structure may be created by a person from the plurality of comments Xm. In this case, at step S200, the CPU 14 of the discussion support device 1 obtains data of the facilitation structure created by the person and input by the person, and stores the obtained data in the flash memory 13. In this case, on the basis of the facilitation structure created by the person, the CPU 14 generates the queries to prompt comments in the discussion so as to be transmissible via a communication network.

Modified Example 2

In the above-described embodiment, in the facilitation structure, the favorable points and unfavorable points that are the evaluations are stored separately from each other. However, the configuration is not necessarily limited thereto, and the favorable points and unfavorable points may be stored in the flash memory 13 simply as the evaluations without being separated from each other.

Modified Example 3

In the above-described embodiment, the CPU 14 executes the processes from step S200 onward each time the new comment is acquired once at step S100 shown in FIG. 4. However, the configuration is not limited to this. For example, the CPU 14 may be configured to execute the processes from step S200 onward each time the new comment is acquired a predetermined number of times of 10 times or more. Further, for example, the CPU 14 may be configured to execute the processes from step S200 onward each time the new comment is acquired a predetermined number of times of 100 times or more. Further, for example, the CPU 14 may be configured to execute the processes from step S200 onward each time the new comment is acquired a predetermined number of times of 1000 times or more.

Normally, when a person becomes a facilitator and facilitates a discussion, the person makes an appeal to prompt comments that are intended to become a child node of a particular node, such as "Does this idea have a favorable point?" or the like, on the basis of the existing facilitation structure. The facilitator adds 1, or 2 or 3 comments in response to this appeal as the child nodes of the particular node.

Prompting comments with respect to the particular node, and repeating an operation to add a small number of comments obtained in response to this as the child nodes in this way is a characteristic of facilitation performed by a person. In this type of flow, it is clear to the facilitator to which of the nodes the received comment is to be added as the child node. As described above, this is because the facilitator has asked for the comment that is to become the child node of the particular node.

In contrast to this, in the present example, it is possible to add, as respective nodes, ten or more, one hundred or more, or one thousand or more comments at a time to the facilitation structure. It is extremely difficult for a person to carry out an operation to create the facilitation structure from many comments in a state in which it is not clear which of the comments includes a phrase that is to be the child node of which of the nodes.

In the present example, the CPU 14 can extract the new node from the comments, using an algorithm such as that explained in the above-described embodiment, and can further select the parent node of the new node. In other words, the discussion support device of the above-described embodiment is extremely suited to performing a process that is extremely difficult for a person, namely, creating the facilitation structure from the many comments, even when it is not clear which of the nodes is to be the child node of which of the nodes.

Modified Example 4

In the above-described embodiment, the CPU 14 performs the process to generate the query inviting a comment in the discussion, such as indicated by step S500 shown in FIG. 4, but this process need not necessarily be executed. In this case also, the CPU 14 achieves the functions and effects not present in the related art, by automatically creating the facilitation structure from the comments.

In this case, this is the state in which it is not clear which of the comments includes a phrase that is to be the child node of which of the nodes. In this type of case, if a person is the facilitator, it is extremely difficult for the facilitator to create the facilitation structure from the comments that are sequentially obtained. This is because it is not possible for the facilitator to make a query.

In contrast to this, in the present example, the CPU 14 can extract the new node from the comments using an algorithm such as that explained in the above-described embodiment, and can further select the parent node of the new node. In other words, the discussion support device of the above-described embodiment is extremely suited to performing a process that is extremely difficult for a person, namely, creating the facilitation structure from the comments that are sequentially obtained, even when it is not clear which of the nodes is to be the child node of which of the nodes.

Modified Example 5

In the above-described embodiment, the CPU 14 executes step S500 on the basis of having acquired the new comment. However, the configuration is not necessarily limited thereto. For example, the CPU 14 may execute step S500 when a comment is not received for a predetermined standby period (one hour, for example).

Modified Example 6

In the above-described embodiment, the wide area network 2 is exemplified as an example of the communication network to which the discussion support device 1 is connected. However, the communication network connected to the discussion support device 1 is not limited to the wide area network 2, and may be any type of communication network.

Modified Example 7

The condition for the node in the facilitation structure to become the node under consideration may be a condition other than the above-described conditions (1) to (4). For example, a favorable point for which there is no child node that is an issue, and an unfavorable point for which there is no child node that is an issue may become the node under consideration. In this case, of the plurality of favorable points or the plurality of unfavorable points in the facilitation structure, on the basis of the fact that there is the node that is the favorable point or the unfavorable point for which there is no child node that is an issue, the CPU 14 may create a query asking for an issue relating to that node, as the query.

Further, similarly, an idea for which there is no child node that is an evaluation may also become the node under consideration. In this case, of the plurality of ideas in the facilitation structure, on the basis of the fact that there is the idea for which there is no child node that is an evaluation, the CPU 14 may create a query asking for an evaluation relating to the idea, as the query.

In other words, of the plurality of nodes included in the facilitation structure, on the basis of the fact that there is a particular node for which there is no child node, the CPU 14 may create a query asking for a phrase to become the child node of the particular node, as the query.

Modified Example 8

In the above-described embodiment, the trained models M01 to M04 of the neural nets are used in the process to extract the new node from among the comments. However, a simple Bayesian classifier or the like may be used instead of the neural net in this process.

Further, in the above-described embodiment, the trained models M11 to M16 of the neural nets are used in the process to calculate the predicted parent node from the new node. However, a simple Bayesian classifier or the like may be used instead of the neural net in this process.

Modified Example 9

In the above-described embodiment, in the facilitation structure, an issue is a child node of a favorable point or an unfavorable point. However, an issue may be a child node of an idea. Further, an issue may be a child node of another issue. Further, an issue may be a child node of the main topic. Further, a parent-child relationship between an issue, a favorable point, an unfavorable point, and an idea may be changed as appropriate and not limited to the above examples. Further, in the above-described embodiment, the facilitation structure includes the five types of nodes, namely, the main topic, the ideas, the issues, the favorable points, and the unfavorable points, but the facilitation structure may include only three types of nodes, namely, means, ideas, and issues.

Modified Example 10

The CPU 14 need not necessarily perform the validity check at step S530. In other words, at step S540, the CPU 14 may contribute the query generated at step S520, without checking the validity thereof.

REFERENCE SIGNS LIST

1 . . . Discussion support device
2 . . . Wide area network
3-6 . . . Terminal
13 . . . Flash memory
Xs . . . Main topic
Xm . . . Comment

The invention claimed is:

1. A discussion support device comprising:
a comment acquisition portion configured to acquire, via a communication network, a plurality of comments relating to a main topic of a discussion, and to store the acquired plurality of comments in a storage medium; and
a structure creating portion configured to create a facilitation structure on the basis of the plurality of comments acquired and stored by the comment acquisition portion, wherein
the facilitation structure includes the main topic as a root node, and is data representing a tree structure including, as a single node thereof, each of a plurality of ideas, each of a plurality of evaluations, and each of a plurality of issues included in the plurality of comments,
the plurality of ideas include a node representing a proposal to solve one of the main topic to be a parent node and an issue to be a parent node among the plurality of issues, the plurality of evaluations include a node representing an evaluation of an idea to be a parent node among the plurality of ideas, and the plurality of issues include a node representing an issue with respect to an evaluation to be a parent node among the plurality of ideas, and
the structure creating portion includes
an extraction portion configured to extract the plurality of ideas, the plurality of evaluations, and the plurality of issues from the plurality of comments stored in the storage medium by the comment acquisition portion,
an identification portion configured to identify a topology between the plurality of ideas, the plurality of evaluations, and the plurality of issues extracted by the extraction portion, and
a recording portion configured to create the facilitation structure so as to realize the topology between the plurality of ideas, the plurality of evaluations, and the plurality of issues identified by the identification portion, and to store the facilitation structure in the storage medium,
the identification portion includes
a predicted parent node generation portion configured to, when one of an idea, an evaluation and an issue is extracted as a new node by the extraction portion, generate a predicted parent node to be a parent node of the new node, separately from the nodes in the facilitation structure, and
a high similarity node selection portion configured to select, from the facilitation structure, a node for which a similarity with the predicted parent node is higher than a predetermined reference,
the recording portion adds the new node to the facilitation structure as a child node of the node selected by the high similarity node selection portion, and
the predicted parent node generation portion generates the predicted parent node by inputting the new node into a trained model that is a neural network trained in advance to generate, when a given node is input thereinto, a node to be a parent node of the given node, separately from the nodes in the facilitation structure.

2. The discussion support device according to claim 1, wherein
for each of the plurality of comments, the extraction portion extracts one of an idea, an evaluation, and an issue included in the comment, by inputting the comment into an idea extraction model that is a neural network trained to output an idea included in the comment when the comment is input thereinto, inputting the comment into an evaluation extraction model that is a neural network trained to output an evaluation included in the comment when the comment is input thereinto, and inputting the comment into an issue extraction model that is a neural network trained to output an issue included in the comment when the comment is input thereinto.

3. The discussion support device according to claim 1, wherein
when the new node is an idea, the predicted parent node generation portion generates the predicted parent node by inputting the new node into a trained model that is a neural network trained in advance to generate, when a given idea is input thereinto, a node to be a parent node of the given idea, separately from the nodes in the facilitation structure,
when the new node is an evaluation, the predicted parent node generation portion generates the predicted parent node by inputting the new node into a trained model that is a neural network trained in advance to generate, when a given evaluation is input thereinto, a node to be a parent node of the given evaluation, separately from the nodes in the facilitation structure, and
when the new node is an issue, the predicted parent node generation portion generates the predicted parent node by inputting the new node into a trained model that is a neural network trained in advance to generate, when a given issue is input thereinto, a node to be a parent node of the given issue, separately from the nodes in the facilitation structure.

4. The discussion support device according to claim 1, further comprising:
a determination portion configured to determine whether or not a predetermined ending condition for the discussion is satisfied, on the basis of the facilitation structure; and
an ending portion configured to, when the determination portion determines that the predetermined ending condition is satisfied, create data indicating that the discussion has ended, the data being transmissible via the communication network.

5. The discussion support device according to claim 1, further comprising:
a guidance portion configured to generate, on the basis of the facilitation structure stored in the storage medium by the recording portion, a query to invite a comment in the discussion, the query being transmissible via the communication network.

6. A non-transitory computer-readable medium storing program causing a discussion support device to function as:
a comment acquisition portion configured to acquire, via a communication network, a plurality of comments relating to a main topic of a discussion, and to store the acquired plurality of comments in a storage medium; and
a structure creating portion configured to create a facilitation structure on the basis of the plurality of comments acquired and stored by the comment acquisition portion, wherein
the facilitation structure includes the main topic as a root node, and is data representing a tree structure including, as a single node thereof, each of a plurality of ideas, each of a plurality of evaluations, and each of a plurality of issues included in the plurality of comments, the plurality of ideas includes a node representing a proposal to solve one of the main topic to be a parent node and an issue to be a parent node among the plurality of issues, the plurality of evaluations includes a node representing an evaluation of an idea to be a parent node among the plurality of ideas, and the plurality of issues includes a node representing an issue relating to an evaluation to be a parent node among the plurality of ideas, and the structure creating portion includes an extraction portion configured to extract the plurality of ideas, the plurality of evaluations, and the plurality of issues from the plurality of comments stored in the storage medium by the comment acquisition portion, an identification portion configured to identify a topology between the plurality of ideas, the plurality of evaluations, and the plurality of issues extracted by the extraction portion, and a recording portion configured to create the facilitation structure so as to realize the topology between the plurality of ideas, the plurality of evaluations, and the plurality of issues identified by the identification portion, and to store the facilitation structure in the storage medium, the identification portion includes a predicted parent node generation portion configured to, when one of an idea, an evaluation and an issue is extracted as a new node by the extraction portion, generate a predicted parent node to be a parent node of the new node, separately from the nodes in the facilitation structure, and a high similarity node selection portion configured to select, from the facilitation structure, a node for which a similarity with the predicted parent node is higher than a predetermined reference, the recording portion adds the new node to the facilitation structure as a child node of the node selected by the high similarity node selection portion, and the predicted parent node generation portion generates the predicted parent node by inputting the new node into a trained model that is a neural network trained in advance to generate, when a given node is input thereinto, a node to be a parent node of the given node, separately from the nodes in the facilitation structure.

7. A method of using a discussion support device comprising:

comment-acquisitioning to acquire, via a communication network, a plurality of comments relating to a main topic of a discussion, and to store the acquired plurality of comments in a storage medium; and structure-creating to create a facilitation structure on the basis of the plurality of comments acquired and stored by the comment-acquisitioning, wherein the facilitation structure includes the main topic as a root node, and is data representing a tree structure including, as a single node thereof, each of a plurality of ideas, each of a plurality of evaluations, and each of a plurality of issues included in the plurality of comments, the plurality of ideas includes a node representing a proposal to solve one of the main topic to be a parent node and an issue to be a parent node among the plurality of issues, the plurality of evaluations includes a node representing an evaluation of an idea to be a parent node among the plurality of ideas, and the plurality of issues includes a node representing an issue relating to an evaluation to be a parent node among the plurality of ideas, and the structure-creating includes extracting to extract the plurality of ideas, the plurality of evaluations, and the plurality of issues from the plurality of comments stored in the storage medium by the comment-acquisitioning, identifying to identify a topology between the plurality of ideas, the plurality of evaluations, and the plurality of issues extracted by the extracting, and recording to create the facilitation structure so as to realize the topology between the plurality of ideas, the plurality of evaluations, and the plurality of issues identified by the identifying, and to store the facilitation structure in the storage medium, the identifying includes a predicted-parent-node-generating to, when one of an idea, an evaluation and an issue is extracted as a new node by the extracting, generate a predicted parent node to be a parent node of the new node, separately from the nodes in the facilitation structure, and a high-similarity-node-selecting to select, from the facilitation structure, a node for which a similarity with the predicted parent node is higher than a predetermined reference, the recording adds the new node to the facilitation structure as a child node of the node selected by the high-similarity-node-selecting, and the predicted-parent-node-generating generates the predicted parent node by inputting the new node into a trained model that is a neural network trained in advance to generate, when a given node is input thereinto, a node to be a parent node of the given node, separately from the nodes in the facilitation structure.

* * * * *